(12) United States Patent
Inomoto

(10) Patent No.: US 9,804,369 B2
(45) Date of Patent: Oct. 31, 2017

(54) ZOOM LENS AND IMAGING APPARATUS INCLUDING THE SAME

(71) Applicant: CANON KABUSHIKI KAISHA, Tokyo (JP)

(72) Inventor: Yu Inomoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 14/947,874

(22) Filed: Nov. 20, 2015

(65) Prior Publication Data

US 2016/0154218 A1     Jun. 2, 2016

(30) Foreign Application Priority Data

Nov. 28, 2014  (JP) ................................. 2014-242517

(51) Int. Cl.
    *G02B 15/14*    (2006.01)
    *G02B 15/173*   (2006.01)
    *G02B 15/177*   (2006.01)

(52) U.S. Cl.
    CPC ......... *G02B 15/173* (2013.01); *G02B 15/177* (2013.01)

(58) Field of Classification Search
    CPC ......... G02B 15/173; G02B 15/28; G02B 9/34
    USPC ........ 359/687, 557, 684, 686, 676, 690, 785
    See application file for complete search history.

(56) References Cited

U.S. PATENT DOCUMENTS 9,432,585 B2 *   8/2016   Yamano ............. H04N 5/23296

FOREIGN PATENT DOCUMENTS

JP    11-23965 A      1/1999
JP    2008-310222 A   12/2008

* cited by examiner

*Primary Examiner* — Bumsuk Won
*Assistant Examiner* — Collin X Beatty
(74) *Attorney, Agent, or Firm* — Canon USA Inc., IP Division

(57) ABSTRACT

A zoom lens includes, in order from an object side to an image side, a first lens unit having positive refractive power, a second lens unit having negative refractive power, a third lens unit having positive refractive power, and a fourth lens unit having positive refractive power. During zooming from a wide-angle end to a telephoto end, the first lens unit does not move and at least the second lens unit and the fourth lens unit move. A distance between adjacent lens units varies during zooming. In the zoom lens, a lens configuration of the first lens unit, a lens configuration of the second lens unit, a focal length of each lens unit, a focal length of the zoom lens at a wide-angle end, and a lateral magnification of the second lens unit during focusing on an infinite-distance object at the telephoto end are appropriately set based on predetermined conditions.

15 Claims, 15 Drawing Sheets

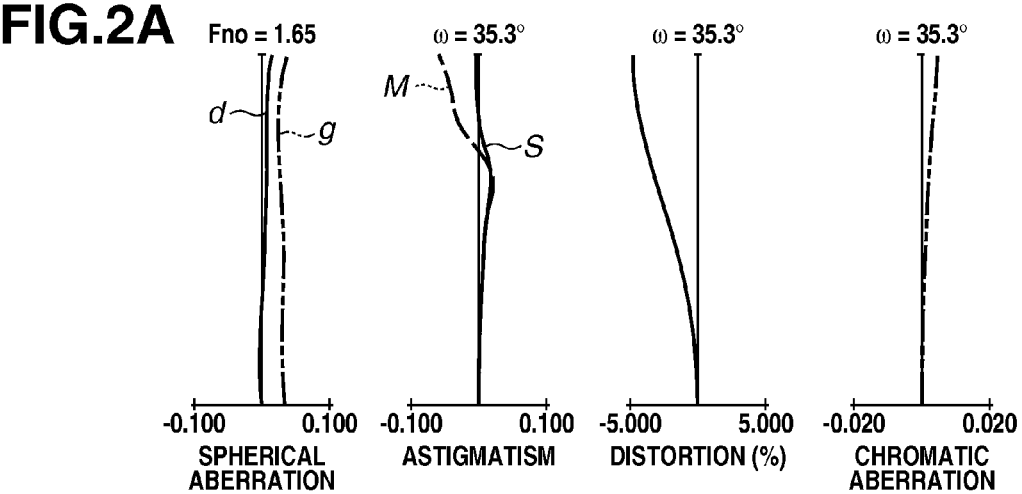
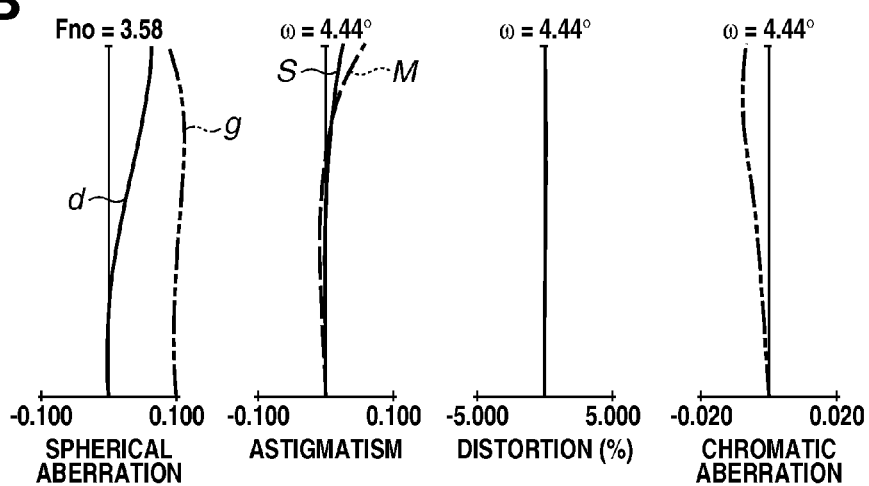
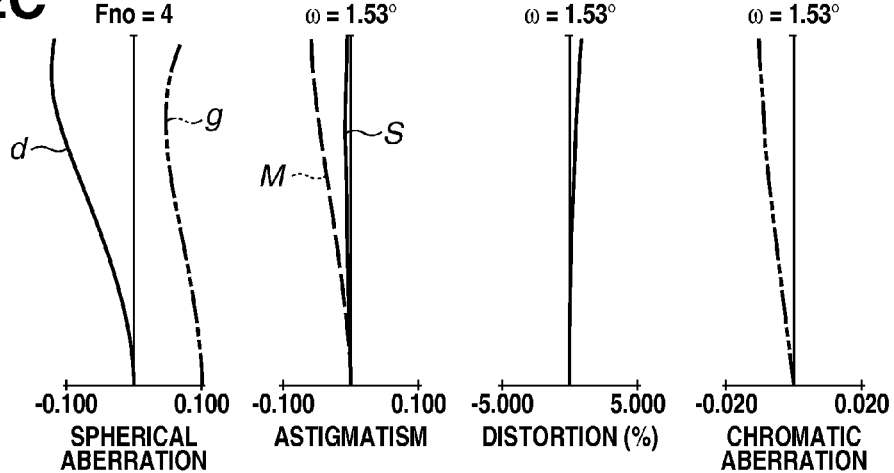

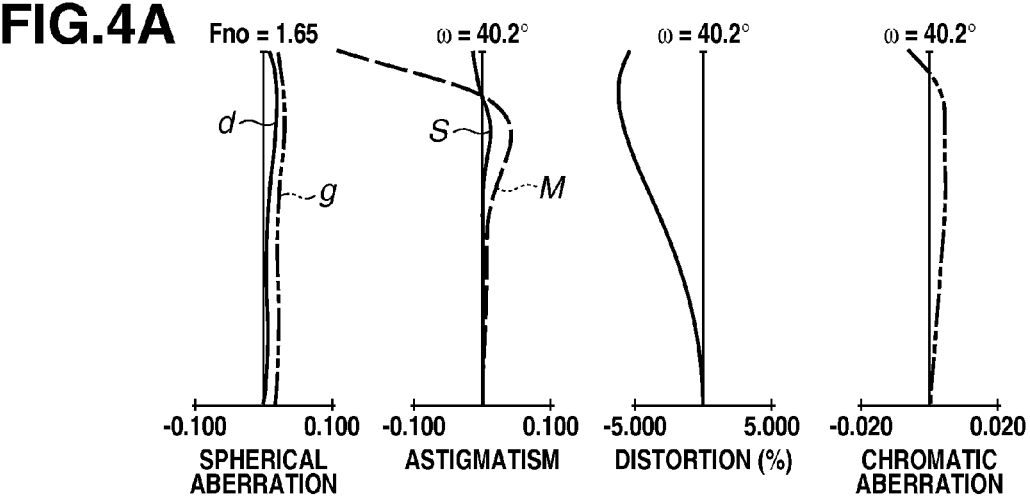
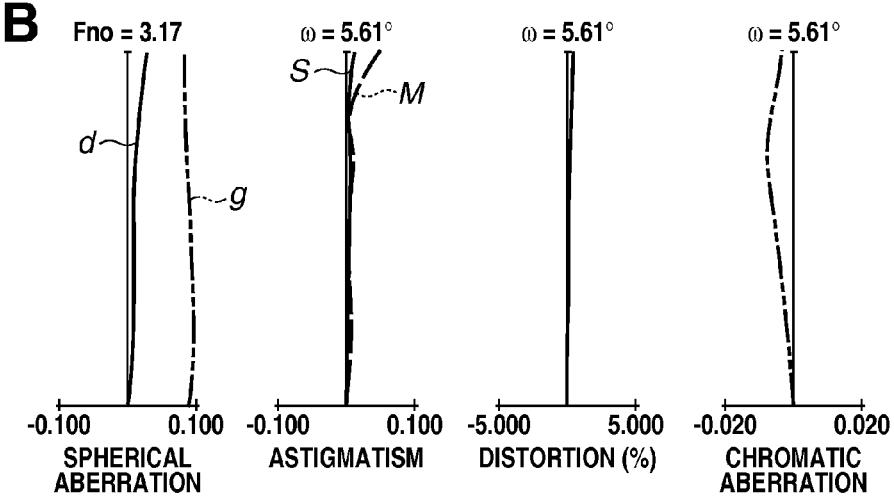
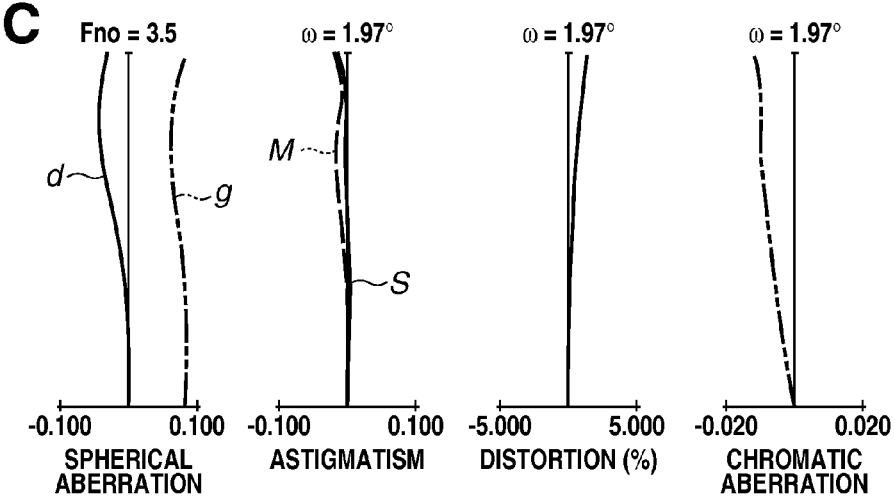

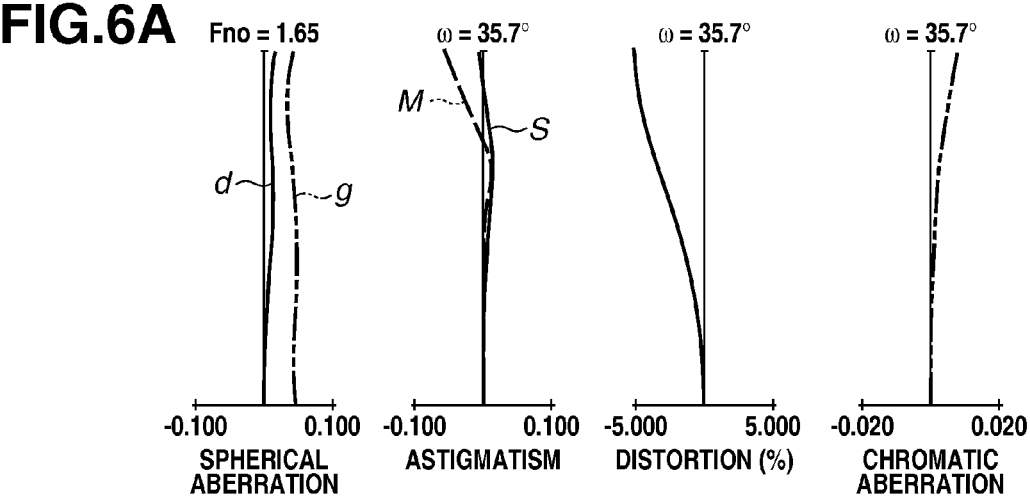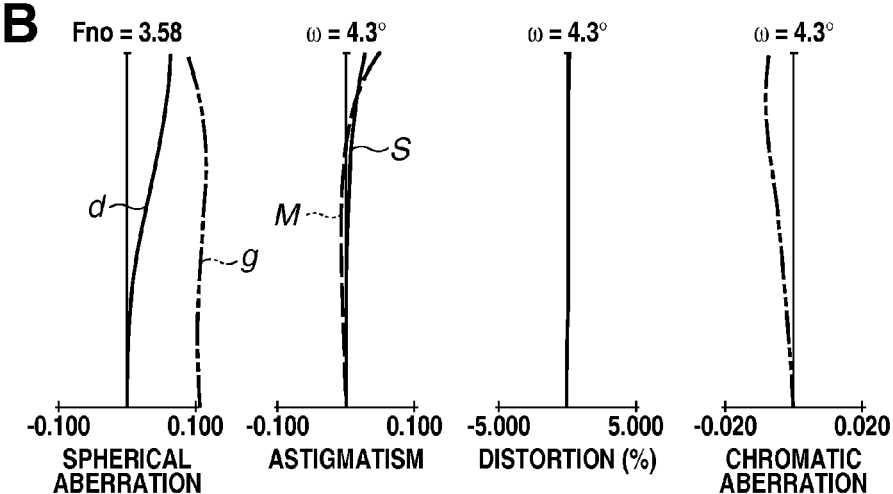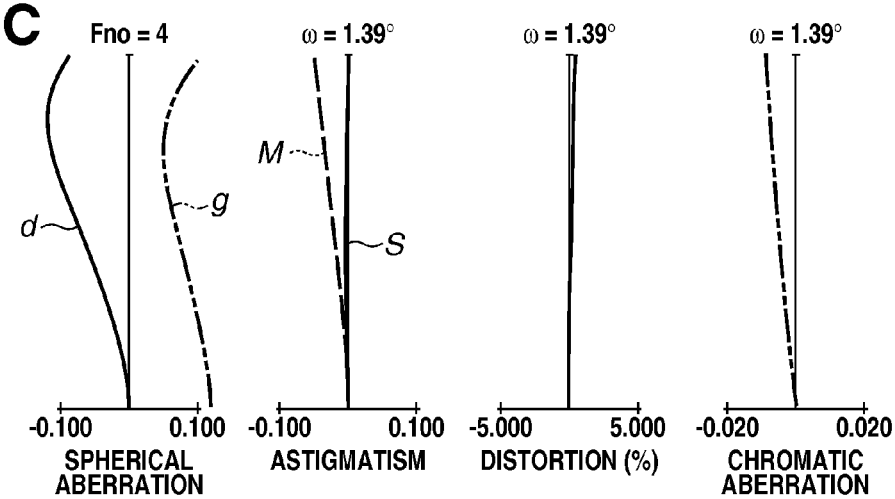

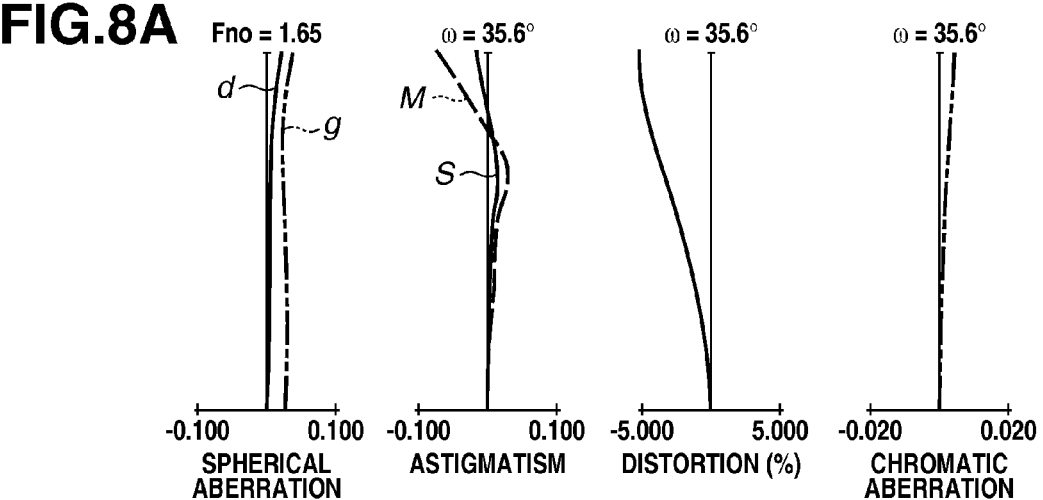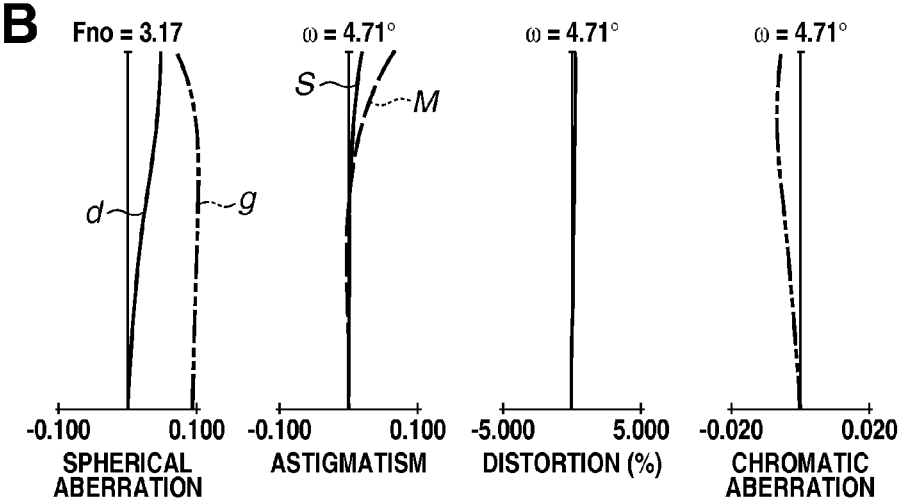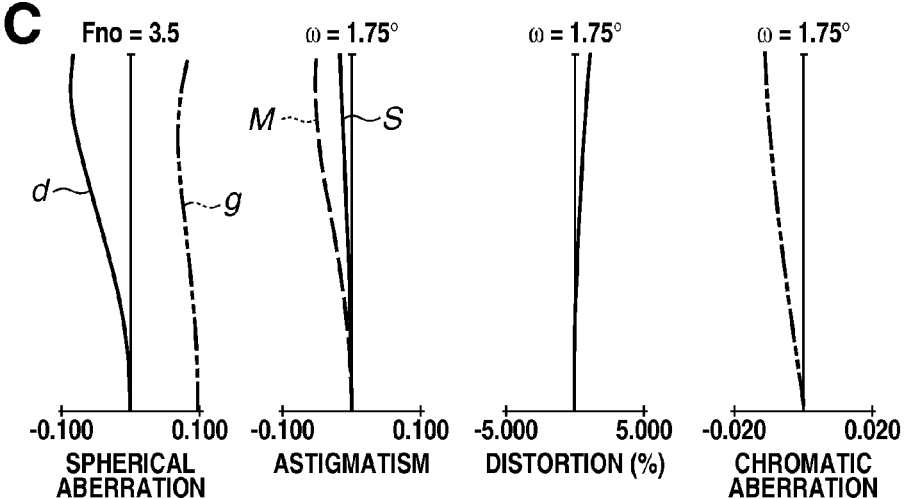

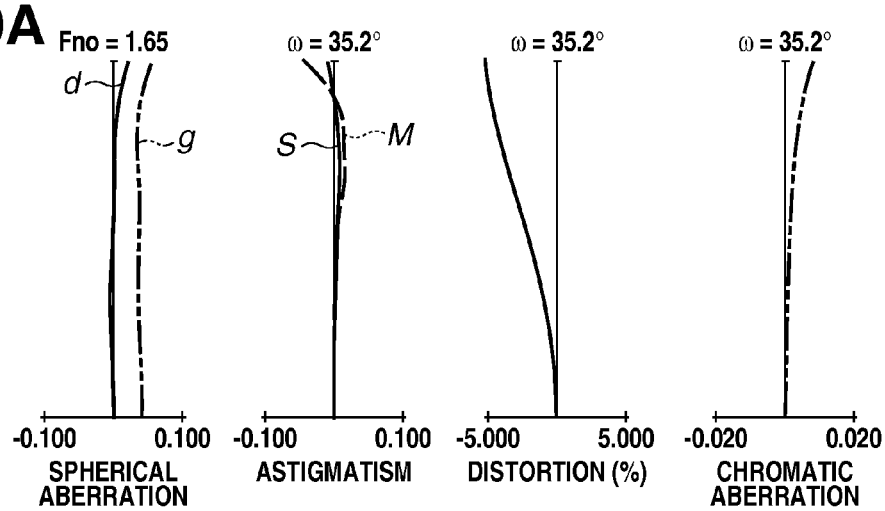
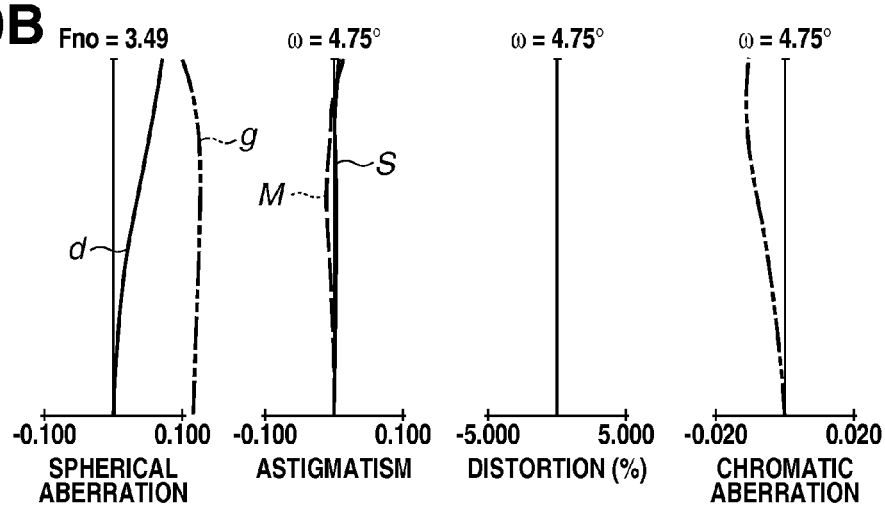
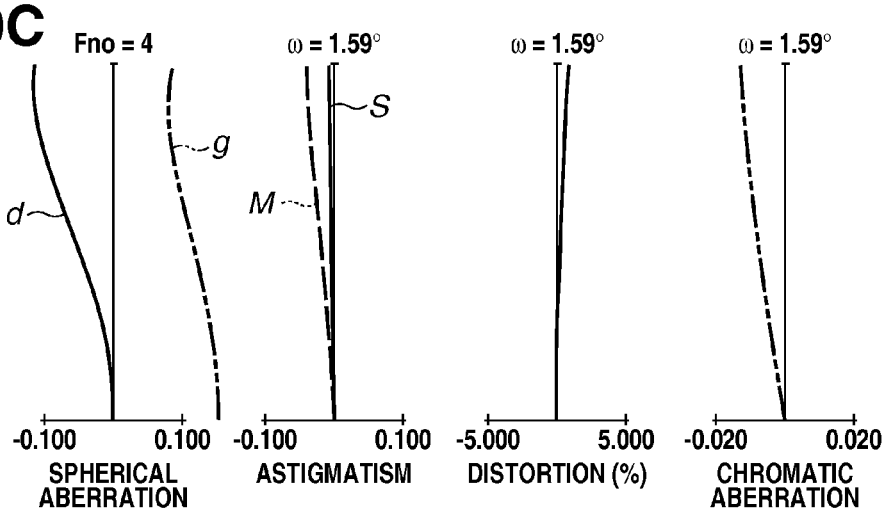

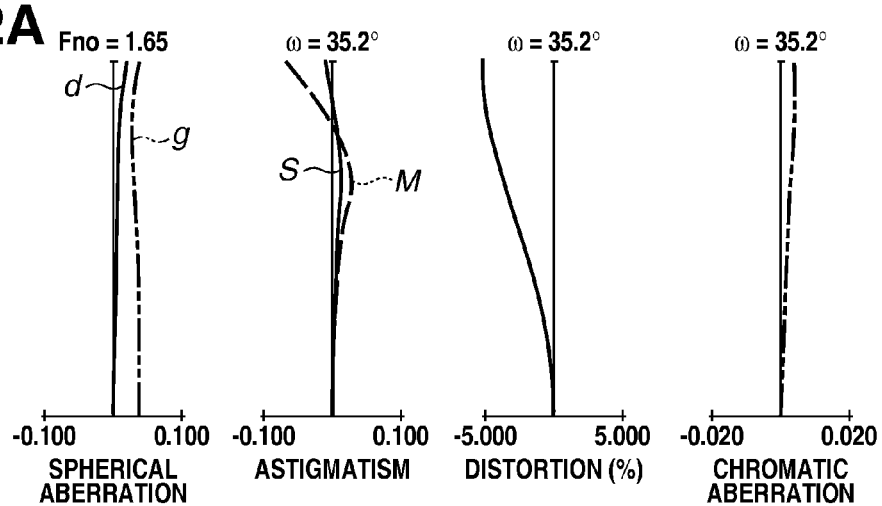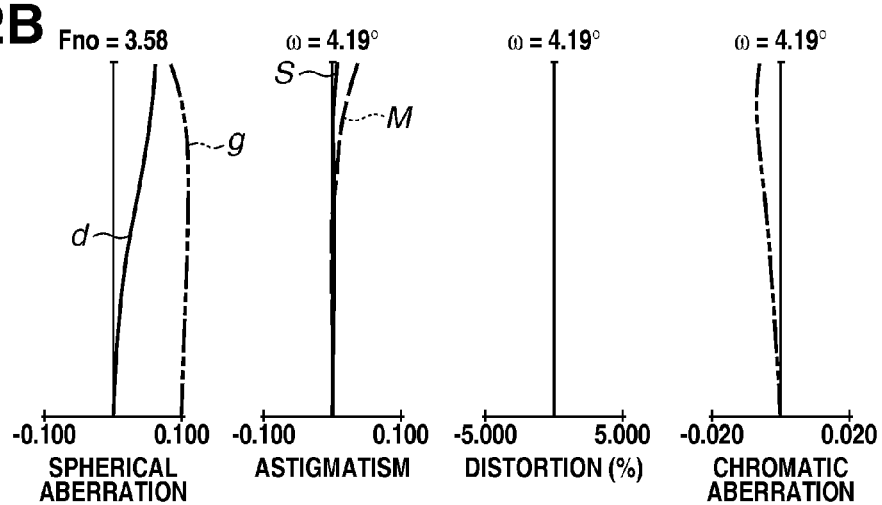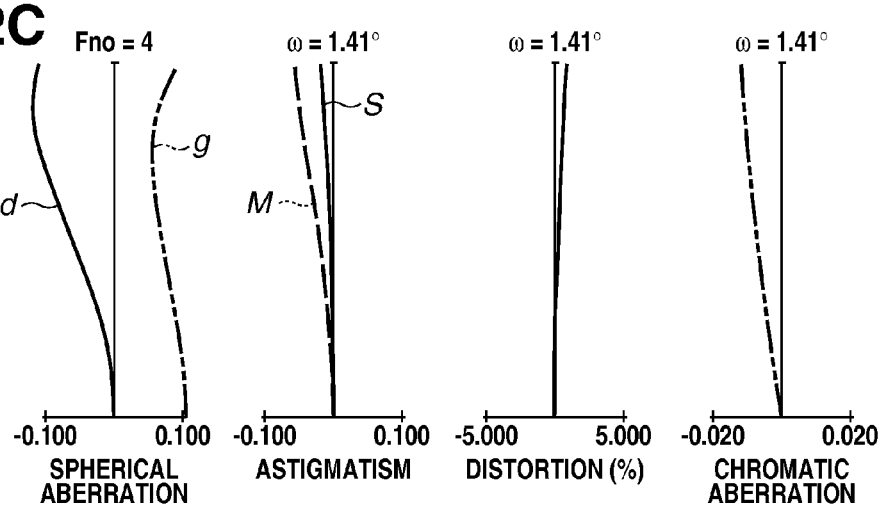

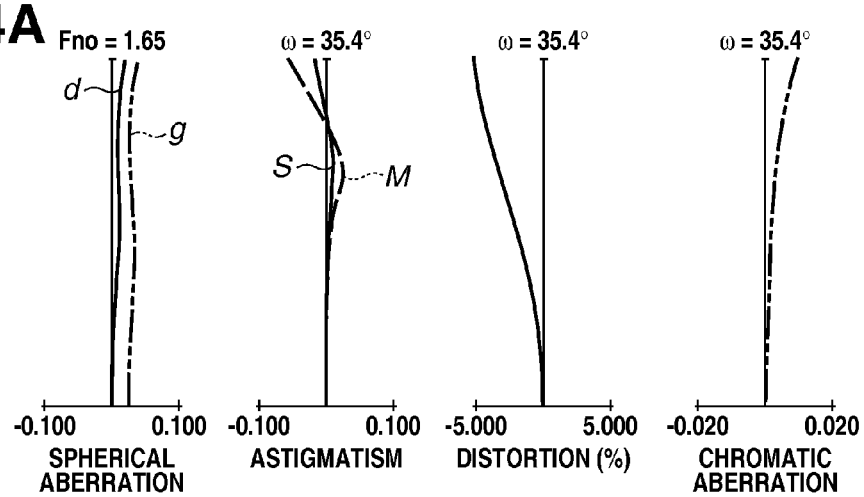
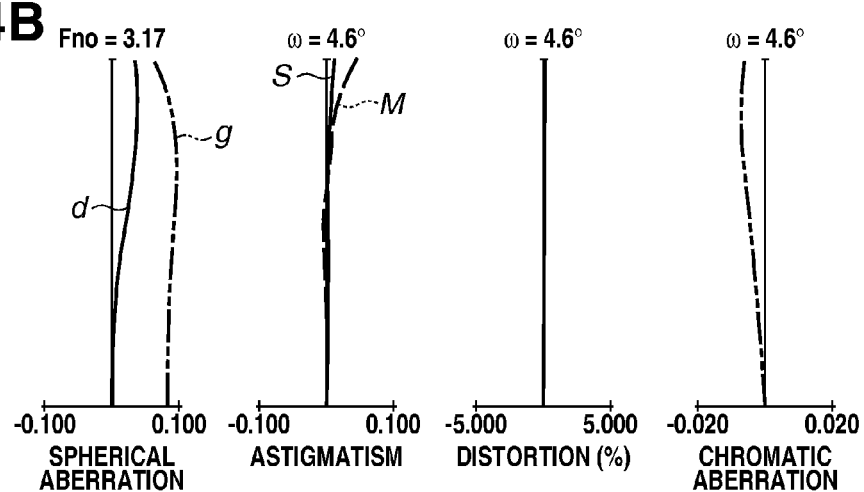
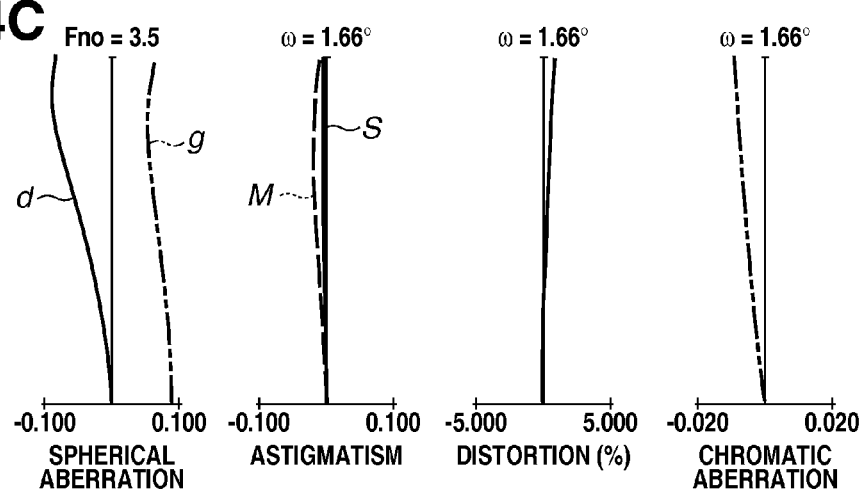

ZOOM LENS AND IMAGING APPARATUS INCLUDING THE SAME

BACKGROUND OF THE INVENTION

Field of the Invention

The present invention relates to a zoom lens and an imaging apparatus including the zoom lens. The present invention is suitable for an imaging apparatus with an image pickup element, such as a digital still camera, a video camera, a monitoring camera, and a broadcasting camera, and an imaging apparatus such as a camera with a silver-halide photographic film.

Description of the Related Art

Imaging apparatuses, such as a digital still camera and a video camera, that use a solid-state image pickup element have been improved to a point that the size of the entire apparatus continues to decrease while its functionality increases. To that end, a zoom lens used in these apparatuses is required to be compact in size, have a high magnification, and provide high optical performance. To meet these requirements, there has been known a zoom lens including lens units that respectively have, in order from an object side to an image side, positive refractive power, negative refractive power, positive refractive power, and positive refractive power.

In zoom lenses of Japanese Patent Application Laid-Open No. 11-23965 and Japanese Patent Application Laid-Open No. 2008-310222, zooming is performed by moving a second lens unit. In these zoom lenses, focusing and compensation of image plane variations caused by zooming are performed by moving a fourth lens unit.

A zoom lens that performs focusing by moving lenses provided on an image side of a first lens unit in this manner is referred to as an inner focus zoom lens. In general, in an inner focus zoom lens, an effective diameter of a first lens unit becomes smaller and the lens system can be more compact, as compared to a zoom lens that performs focusing by moving its first lens unit.

Generally, in a zoom lens, reducing the number of lenses while enhancing the refractive power of each lens unit of the zoom lens can downsize the entire system while achieving a high magnification. Nevertheless, when the refractive power of each lens surface becomes strong, reduction in optical performance is likely to occur.

In a zoom lens including lens units respectively having, in order from an object side to an image side, positive refractive power, negative refractive power, positive refractive power, and positive refractive power, it is important to appropriately set refractive power of each lens unit and materials of the lenses to maintain high optical performance while realizing a higher magnification and a further downsizing the lens' size.

SUMMARY OF THE INVENTION

According to an aspect of the present invention, a zoom lens includes, in order from an object side to an image side, a first lens unit having positive refractive power, a second lens unit having negative refractive power, a third lens unit having positive refractive power, and a fourth lens unit having positive refractive power, wherein, during zooming from a wide-angle end to a telephoto end, the first lens unit does not move and at least the second lens unit and the fourth lens unit move, and a distance between adjacent lens units varies during zooming, wherein the first lens unit includes, in order from the object side to the image side thereof, a negative lens, a positive lens, a positive lens, and a positive lens, and the second lens unit includes three or more lens elements including at least one positive lens, wherein one of the positive lenses included in the first lens unit satisfies a following conditional expression:

$$74.0 < vd1p < 100.0,$$

wherein the second lens unit includes a positive lens that satisfies a following conditional expression:

$$10.0 < vd2p < 21.0,$$

where Abbe number of a material of the one positive lens included in the first lens unit is denoted by $vd1p$ and Abbe number of a material of the positive lens provided in the second lens unit is denoted by $vd2p$, and wherein following conditional expressions are satisfied:

$$-7.30 < f1/f2 < -4.60,$$

$$1.16 < f3/f4 < 1.55,$$

$$3.80 < f4/fw < 6.50, \text{ and}$$

$$-12.00 < \beta 2t < -5.80,$$

where a focal length of the first lens unit is denoted by $f1$, a focal length of the second lens unit is denoted by $f2$, a focal length of the third lens unit is denoted by $f3$, a focal length of the fourth lens unit is denoted by $f4$, a focal length of an entire system at the wide-angle end is denoted by $fw$, and a lateral magnification of the second lens unit during focusing on an infinite-distance object at the telephoto end is denoted by $\beta 2t$.

Further features of the present invention will become apparent from the following description of exemplary embodiments with reference to the attached drawings.

BRIEF DESCRIPTION OF THE DRAWINGS

FIGS. 2A, 2B and 2C are aberration diagrams of the zoom lens at the wide-angle end, a middle zoom position, and a telephoto end, respectively, according to the first exemplary embodiment.

FIGS. 4A, 4B and 4C are aberration diagrams of the zoom lens at the wide-angle end, a middle zoom position, and a telephoto end, respectively, according to the second exemplary embodiment.

FIGS. 6A, 6B and 6C are aberration diagrams of the zoom lens at the wide-angle end, a middle zoom position, and a telephoto end, respectively, according to the third exemplary embodiment.

FIGS. 8A, 8B and 8C are aberration diagrams of the zoom lens at the wide-angle end, a middle zoom position, and a telephoto end, respectively, according to the fourth exemplary embodiment.

FIGS. 10A, 10B and 10C are aberration diagrams of the zoom lens at the wide-angle end, a middle zoom position, and a telephoto end, respectively, according to the fifth exemplary embodiment.

FIGS. 12A, 12B and 12C are aberration diagrams of the zoom lens at the wide-angle end, a middle zoom position, and a telephoto end, respectively, according to the sixth exemplary embodiment.

FIGS. 14A, 14B and 14C are aberration diagrams of the zoom lens at the wide-angle end, a middle zoom position, and a telephoto end, respectively, according to the seventh exemplary embodiment.

DESCRIPTION OF THE EMBODIMENTS

A zoom lens and an imaging apparatus including the zoom lens according to an exemplary embodiment of the present invention will be described in detail with reference to the accompanied drawings. The zoom lens according to an exemplary embodiment of the present invention includes, in order from an object side to an image side, a first lens unit having positive refractive power, a second lens unit having negative refractive power, a third lens unit having positive refractive power, and a fourth lens unit having positive refractive power. Here, the lens unit refers to a lens element which integrally moves during zooming. The lens unit is only required to include one or more lenses, and does not necessarily include a plurality of lenses. Further, the lens element refers to an integrally formed lens such as a single lens, a cemented lens in which a plurality of lenses is cemented, or a replica aspheric lens formed by stacking resin layers on the surface of a spherical lens.

Figure 1:
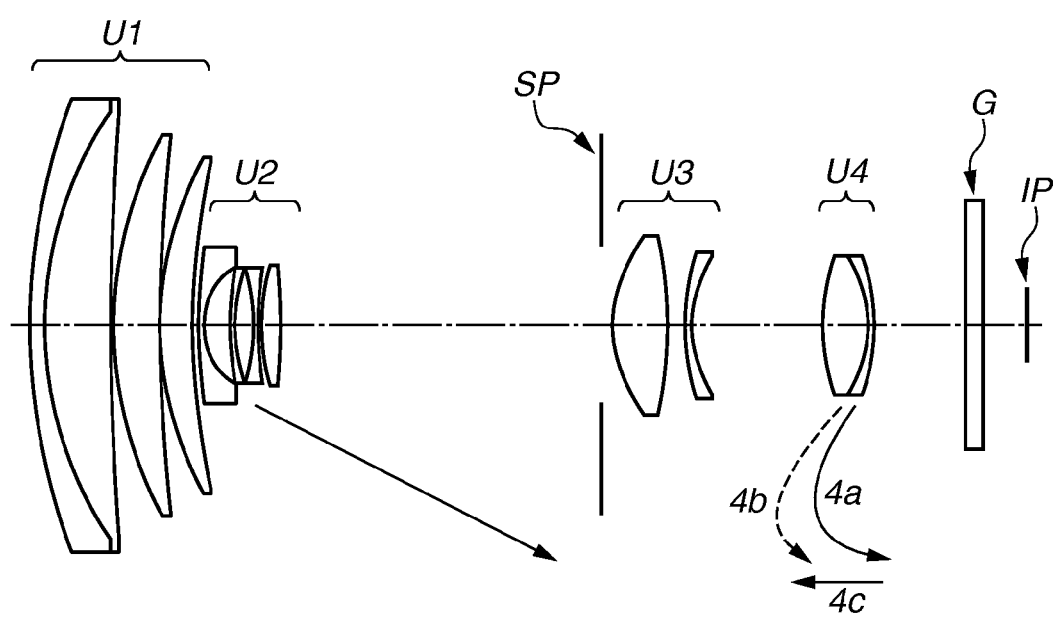
FIG. 1 is a lens cross-sectional view of a zoom lens at a wide-angle end according to a first exemplary embodiment.
Figure 3:
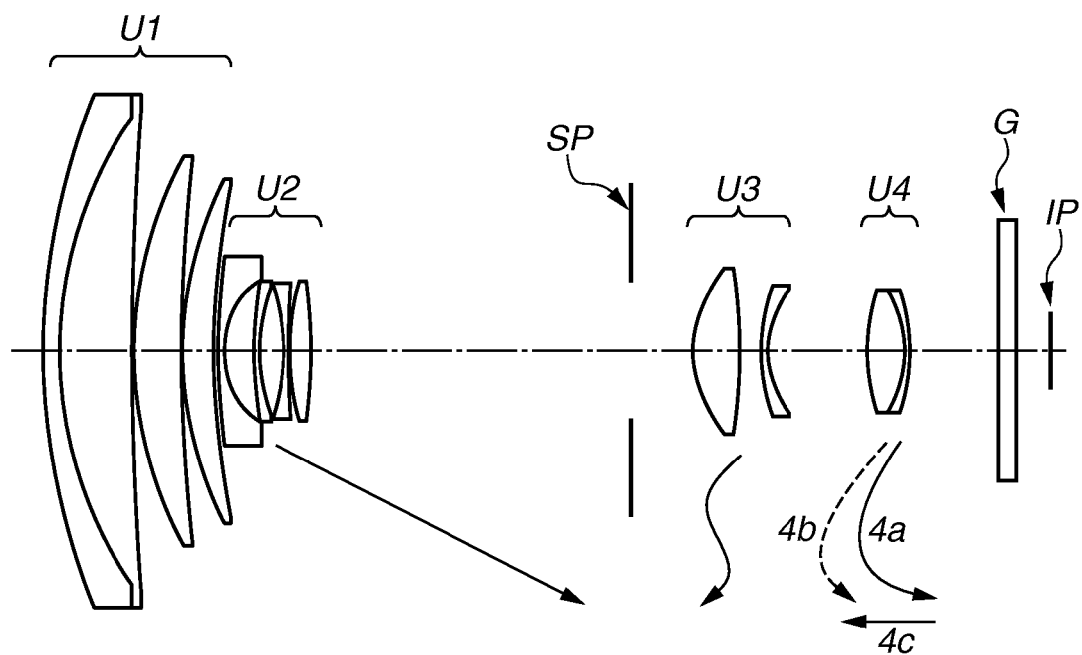
FIG. 3 is a lens cross-sectional view of a zoom lens at a wide-angle end according to a second exemplary embodiment.

FIG. 1 is a lens cross-sectional view of a zoom lens at a wide-angle end according to a first exemplary embodiment. FIGS. 2A, 2B and 2C are aberration diagrams of the zoom lens at the wide-angle end, a middle zoom position, and a telephoto end, respectively, according to the first exemplary embodiment. In the first exemplary embodiment, the zoom lens has a zoom ratio of 24.95 and an aperture ratio of about 1.65 to 4.00. FIG. 3 is a lens cross-sectional view of a zoom lens at a wide-angle end according to a second exemplary embodiment. FIGS. 4A, 4B and 4C are aberration diagrams of the zoom lens at the wide-angle end, a middle zoom position, and a telephoto end, respectively, according to the second exemplary embodiment. In the second exemplary embodiment, the zoom lens has a zoom ratio of 22.99 and an aperture ratio of about 1.65 to 3.50.

Figure 5:
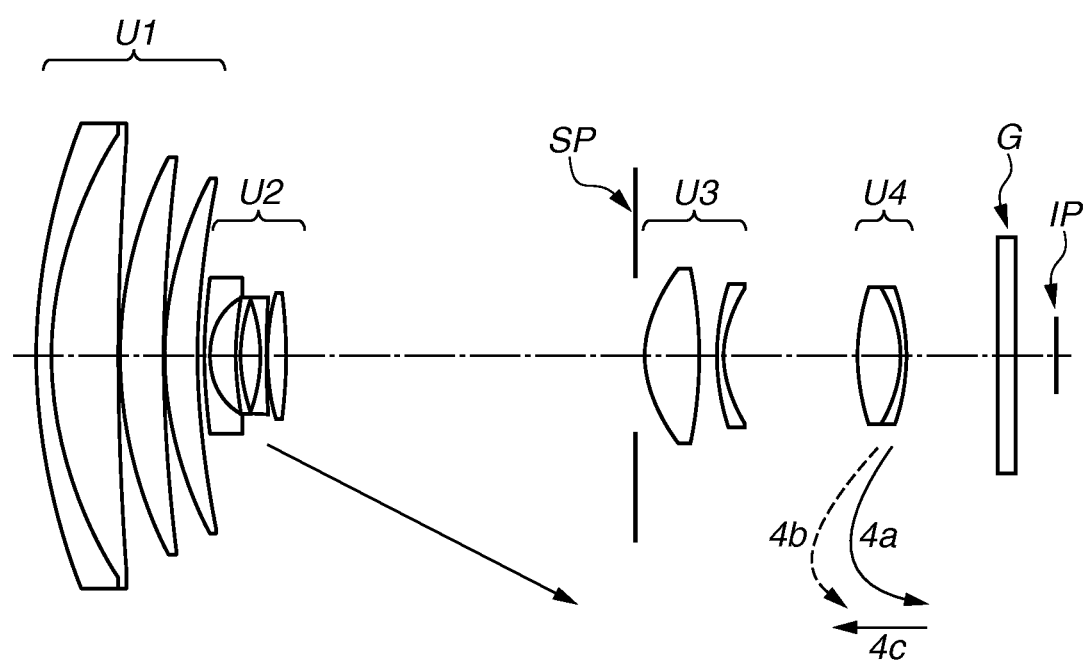
FIG. 5 is a lens cross-sectional view of a zoom lens at a wide-angle end according to a third exemplary embodiment.
Figure 7:
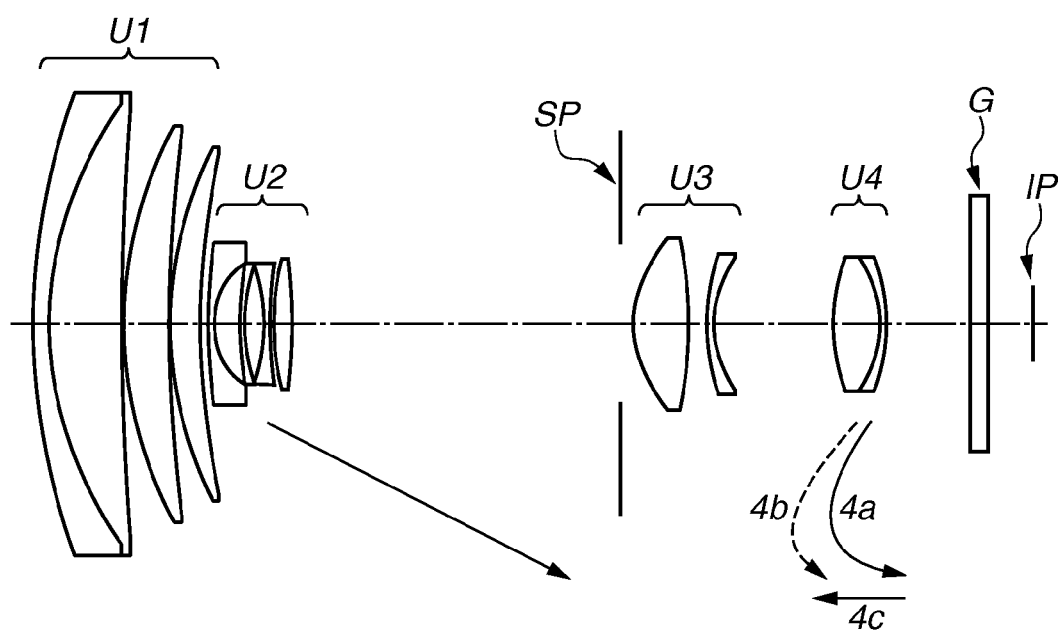
FIG. 7 is a lens cross-sectional view of a zoom lens at a wide-angle end according to a fourth exemplary embodiment.

FIG. 5 is a lens cross-sectional view of a zoom lens at a wide-angle end according to a third exemplary embodiment. FIGS. 6A, 6B, and 6C are aberration diagrams of the zoom lens at the wide-angle end, a middle zoom position, and a telephoto end, respectively, according to the third exemplary embodiment. In the third exemplary embodiment, the zoom lens has a zoom ratio of 27.93 and an aperture ratio of about 1.65 to 4.00. FIG. 7 is a lens cross-sectional view of a zoom lens at a wide-angle end according to a fourth exemplary embodiment. FIGS. 8A, 8B, 8C are aberration diagrams of the zoom lens at the wide-angle end, a middle zoom position, and a telephoto end, respectively, according to the fourth exemplary embodiment. In the fourth exemplary embodiment, the zoom lens has a zoom ratio of 21.97 and an aperture ratio of about 1.65 to 3.50.

Figure 9:
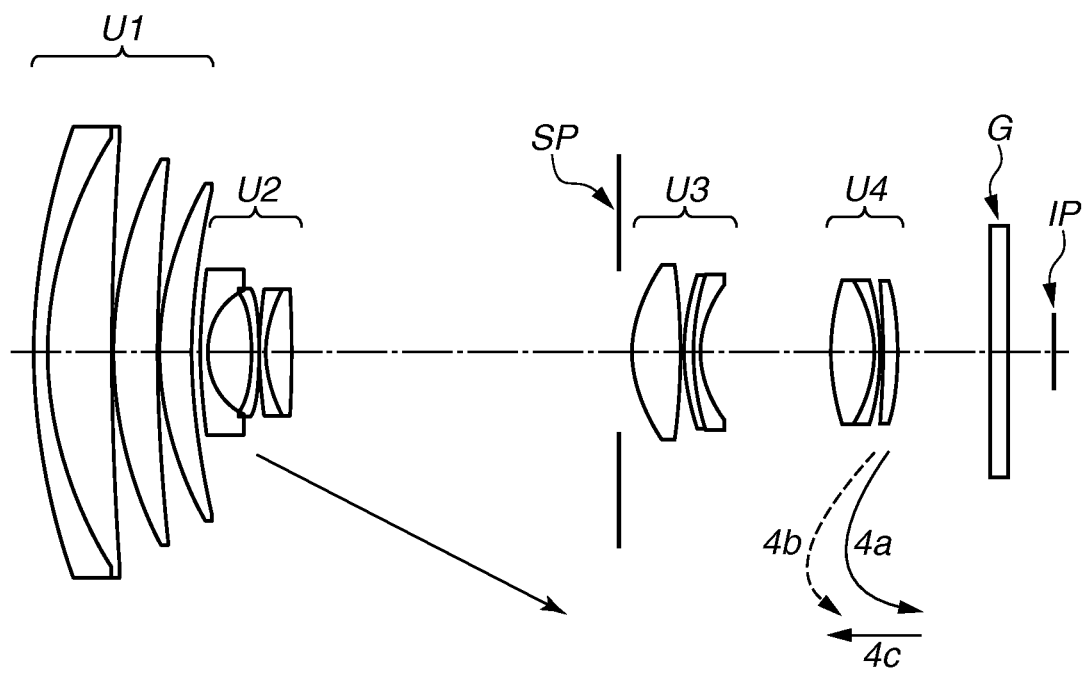
FIG. 9 is a lens cross-sectional view of a zoom lens at a wide-angle end according to a fifth exemplary embodiment.
Figure 11:
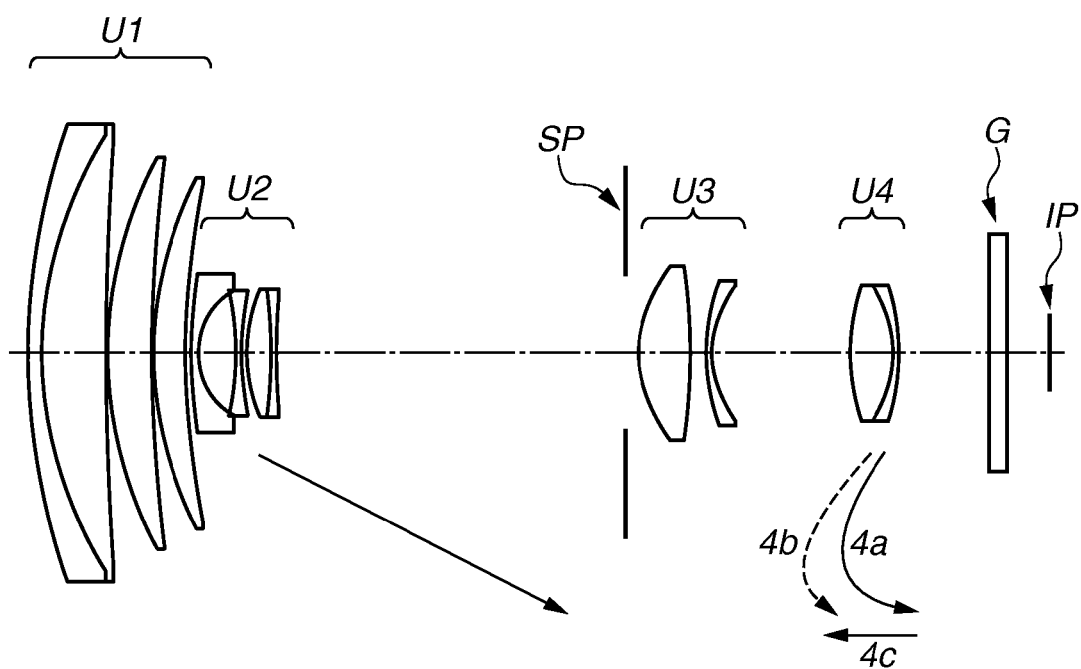
FIG. 11 is a lens cross-sectional view of a zoom lens at a wide-angle end according to a sixth exemplary embodiment.

FIG. 9 is a lens cross-sectional view of a zoom lens at a wide-angle end according to a fifth exemplary embodiment. FIGS. 10A, 10B, and 10C are aberration diagrams of the zoom lens at the wide-angle end, a middle zoom position, and a telephoto end, respectively, according to the fifth exemplary embodiment. In the fifth exemplary embodiment, the zoom lens has a zoom ratio of 23.92 and an aperture ratio of about 1.65 to 4.00. FIG. 11 is a lens cross-sectional view of a zoom lens at a wide-angle end according to a sixth exemplary embodiment. FIGS. 12A, 12B, and 12C are aberration diagrams of the zoom lens at the wide-angle end, a middle zoom position, and a telephoto end, respectively, according to the sixth exemplary embodiment. In the sixth exemplary embodiment, the zoom lens has a zoom ratio of 26.95 and an aperture ratio of about 1.65 to 4.00.

Figure 13:
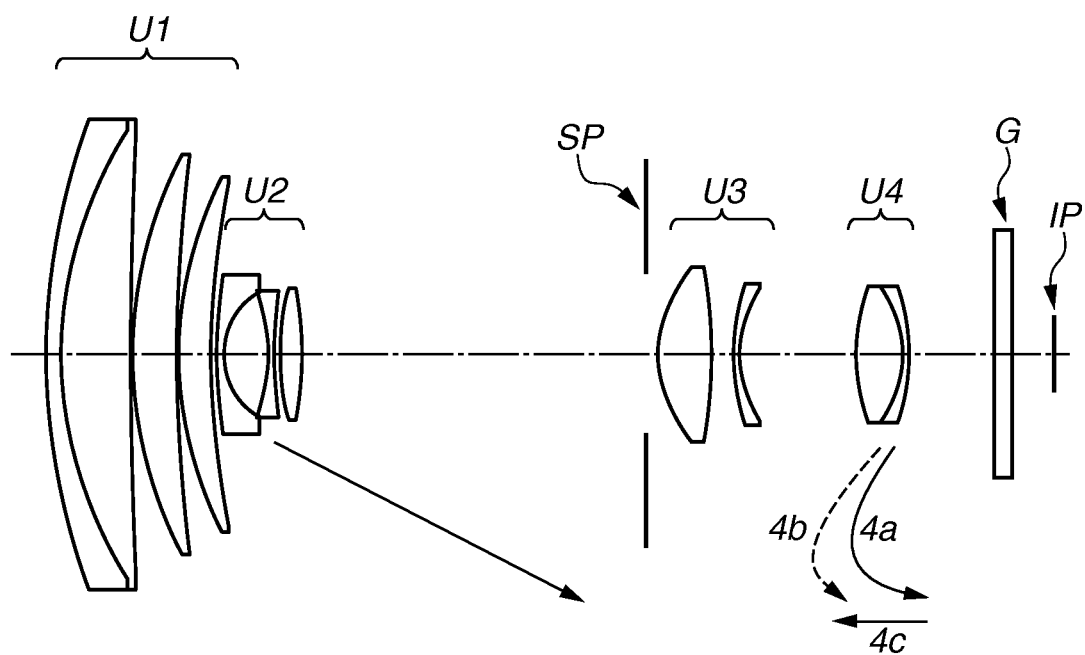
FIG. 13 is a lens cross-sectional view of a zoom lens at a wide-angle end according to a seventh exemplary embodiment.

FIG. 13 is a lens cross-sectional view of a zoom lens at a wide-angle end according to a seventh exemplary embodiment. FIGS. 14A, 14B, and 14C are aberration diagrams of the zoom lens at the wide-angle end, a middle zoom position, and a telephoto end, respectively, according to the seventh exemplary embodiment. In the seventh exemplary embodiment, the zoom lens has a zoom ratio of 22.97 and an aperture ratio of about 1.65 to 3.50.

Figure 15:
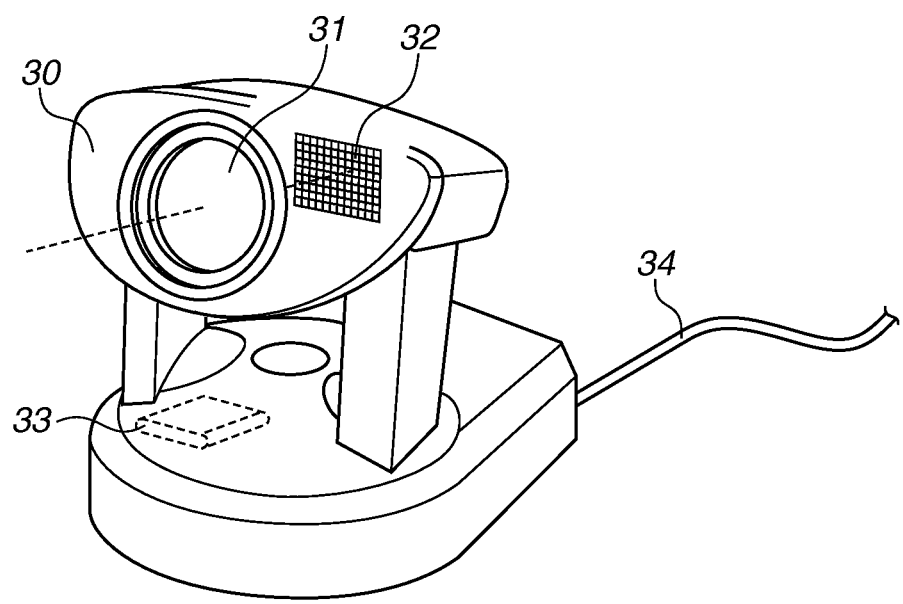
FIG. 15 is a schematic diagram of a main part of an imaging apparatus according to an exemplary embodiment of the present invention.

FIG. 15 is a schematic diagram of a main part of a monitoring camera including a zoom lens according to an exemplary embodiment of the present invention. The zoom lens according to each exemplary embodiment is an imaging lens system used in an imaging apparatus such as a video camera, a digital still camera, a silver-halide film camera, a monitoring camera and the like.

In the lens cross-sectional views, the left side is an object side (front side) and the right side is an image side (rear side). Further, in the lens cross-sectional views, a lens unit Ui represents the ninth lens unit where "i" represents the order of the lens unit from the object side to the image side.

The zoom lens according to each exemplary embodiment includes, in order from the object side to the image side, a first lens unit U1 having positive refractive power, a second lens unit U2 having negative refractive power, a third lens unit U3 having positive refractive power, and a fourth lens unit U4 having positive refractive power.

In each exemplary embodiment, an aperture stop SP is provided between the second lens unit U2 and the third lens unit U3. When zooming is performed from the wide-angle end to telephoto end, the aperture stop SP does not move.

An optical block G corresponds to an optical filter, a face plate, a low-pass filter, an infrared cut filter, or the like. When the zoom lens is used as an imaging optical system of a video camera or a digital camera, an image plane IP serves as a solid-state image pickup element (a photoelectric conversion element) such as a charge-coupled device (CCD) sensor and a complementary metal-oxide semiconductor (CMOS) sensor. When the zoom lens is used as an imaging optical system of a silver-halide film camera, the image plane IP serves as a film plane.

In the spherical aberration diagrams, "Fno" represents an F number, and the spherical aberration diagrams indicate spherical aberration for a d line (wavelength of 587.6 nm) and a g line (wavelength of 435.8 nm). In the astigmatism diagrams, "S" represents a sagittal image plane and "M" represents a meridional image plane. The distortion aberration diagrams indicate distortion aberration for the d line.

The chromatic aberration diagrams indicate chromatic aberration for the d line. "ω" represents an imaging half angle of view.

In each exemplary embodiment, as indicated by arrows in the lens cross-sectional view, the lens units move during zooming from the wide-angle end to the telephoto end, and the distance between the adjacent lens units varies. Specifically, in each exemplary embodiment, during zooming from the wide-angle end to the telephoto end, the first lens unit U1 does not move. The second lens unit U2 moves toward the image side. In each of the zoom lenses according to the first and third to seventh exemplary embodiments, the third lens unit U3 does not move during zooming from the wide-angle end to the telephoto end. In the zoom lens according to the second exemplary embodiment, during zooming from the wide-angle end to the telephoto end, the third lens unit U3 moves toward the object side, then moves toward the image side, and again moves to the object side.

In the zoom lens according to each exemplary embodiment, during zooming from the wide-angle end to the telephoto end, the fourth lens unit U4 moves while drawing a locus convex toward the object side to compensate image plane variations caused by zooming.

Further, in the zoom lens according to each exemplary embodiment, the fourth lens unit U4 serves as a focus lens unit. In the zoom lens according to each exemplary embodiment, when focusing is performed from an infinite-distance object to a near-distance object at the telephoto end, the fourth lens unit U4 is moved toward the object side as indicated by an arrow 4c in each lens cross-sectional view. A solid line arrow 4a and a dotted line arrow 4b in each lens cross-sectional view indicate moving loci for compensating image plane variations caused by zooming from the wide-angle end to the telephoto end, when the infinite-distance object and the near-distance object are focused on, respectively.

In the zoom lens according to each exemplary embodiment, by making the first lens unit U1 immovable during zooming, the total lens length at the telephoto end is shortened. Further, by making the first lens unit U1 immovable during zooming, the accuracy of position control of the first lens unit U1 can be enhanced.

Further, the zoom lens according to each exemplary embodiment satisfies the following conditional expressions:

$$-7.30 < f1/f2 < -4.60 \quad (1)$$

$$1.16 < f3/f4 < 1.55 \quad (2)$$

$$3.80 < f4/fw < 6.50 \quad (3)$$

$$-12.00 < \beta 2t < -5.80 \quad (4)$$

Further, the first lens unit U1 includes a positive lens that satisfies the following conditional expression:

$$74.0 < vd1p < 100.0 \quad (5),$$

and the second lens unit U2 includes a positive lens that satisfies the following conditional expression:

$$10.0 < vd2p < 21.0 \quad (6).$$

In the conditional expressions, the focal length of the first lens unit U1 is denoted by "f1," the focal length of the second lens unit U2 is denoted by "f2," the focal length of the third lens unit U3 is denoted by "f3," the focal length of the fourth lens unit U4 is denoted by "f4," and the focal length of the entire system at the wide-angle end is denoted by "fw." Further, the lateral magnification of the second lens unit U2 during focusing on the infinite-distance object at the telephoto end is denoted by "β2t," the Abbe number of a material of a positive lens provided in the first lens unit U1 is denoted by "vd1p," and the Abbe number of a material of a positive lens provided in the second lens unit U2 is denoted by "vd2p."

The conditional expression (1) defines a ratio between the focal length f1 of the first lens unit U1 and the focal length f2 of the second lens unit U2.

When the focal length f2 of the second lens unit U2 becomes longer so that the ratio f1/f2 exceeds an upper limit of the conditional expression (1), refractive power of the second lens unit U2 becomes too weak, and to realize high magnification, the amount of movement of the second lens unit U2 during zooming accordingly becomes too large. This consequently increases the size of the zoom lens, which is not preferable. When the focal length f2 of the second lens unit U2 becomes shorter so that the ratio f1/f2 falls below a lower limit of the conditional expression (1), the refractive power of the second lens unit U2 becomes too strong, and variations in various aberrations accordingly increase during zooming, which is not preferable.

The conditional expression (2) defines a ratio between the focal length f3 of the third lens unit U3 and the focal length f4 of the fourth lens unit U4.

When the focal length f4 of the fourth lens unit U4 becomes shorter so that the ratio f3/f4 exceeds an upper limit of the conditional expression (2), refractive power of the fourth lens unit U4 becomes too strong. This consequently causes imbalance between aberration correction in the third lens unit U3 and aberration correction in the fourth lens unit U4. Especially, variation in image plane curvature or astigmatism that is caused by zooming increases, and it accordingly becomes difficult to maintain high optical performance throughout the entire zoom area, which is not preferable.

When the focal length f4 of the fourth lens unit U4 becomes longer so that the ratio f3/f4 falls below a lower limit of the conditional expression (2), refractive power of the fourth lens unit U4 becomes too weak. This consequently increases an amount of movement of the fourth lens unit U4 during focusing and zooming increases, and the total lens length accordingly increases, which is not preferable.

The conditional expression (3) defines a ratio between the focal length f4 of the fourth lens unit U4 and the focal length fw of the entire system at the wide-angle end.

When the focal length f4 of the fourth lens unit U4 becomes longer so that the ratio f4/fw exceeds an upper limit of the conditional expression (3), the refractive power of the fourth lens unit U4 becomes too weak. This consequently increases the amount of movement of the fourth lens unit U4 during focusing and zooming, and the total lens length accordingly increases, which is not preferable.

When the focal length f4 of the fourth lens unit U4 becomes shorter so that the ratio f4/fw falls below a lower limit of the conditional expression (3), the refractive power of the fourth lens unit U4 becomes too strong. This consequently increases variation in image plane curvature and astigmatism that is caused by zooming, which is not preferable.

The conditional expression (4) defines a value range of a lateral magnification β2t of the second lens unit U2 during focusing on the infinite-distance object at the telephoto end.

When the lateral magnification β2t of the second lens unit U2 at the telephoto end becomes lower than an upper limit of the conditional expression (4), it becomes difficult to realize a high magnification, which is not preferable. When the lateral magnification β2t of the second lens unit U2 at the telephoto end becomes higher than a lower limit of the conditional expression (4), the position sensitivity of the second lens unit U2 becomes too high, and a manufacturing error accordingly becomes more likely to occur, which is not preferable.

The conditional expression (5) defines a value range of the Abbe number vd1p of a material of a positive lens provided in the first lens unit U1.

When the Abbe number vd1p of the material of the positive lens provided in the first lens unit U1 becomes larger than an upper limit of the conditional expression (5), an axial chromatic aberration is excessively corrected, and it accordingly becomes difficult to maintain high optical performance, which is not preferable. When the Abbe number vd1p of the material of the positive lens provided in the first lens unit U1 becomes smaller than a lower limit of the conditional expression (5), it becomes difficult to sufficiently correct the axial chromatic aberration, which is not preferable.

The conditional expression (6) defines a value range of the Abbe number vd2p of a material of a positive lens included in the second lens unit U2. Generally, when a high magnification of the zoom lens is to be achieved, axial chromatic aberration is likely to occur especially at the telephoto end. Here, by providing a positive lens using a highly-dispersive material in the second lens unit U2 having negative refractive power, the axial chromatic aberration can be efficiently corrected.

When the Abbe number vd2p of the material of the positive lens included in the second lens unit U2 becomes larger than an upper limit of the conditional expression (6), it becomes difficult to sufficiently correct the axial chromatic aberration, which is not preferable.

When the Abbe number vd2p of the material of the positive lens included in the second lens unit U2 becomes smaller than a lower limit of the conditional expression (6), the axial chromatic aberration is excessively corrected, and variation in chromatic aberration of magnification that is caused by zooming increases, which is not preferable.

As described above, in each exemplary embodiment, each element is appropriately set to satisfy the conditional expressions (1) to (6). With this configuration, a compact and high-magnification zoom lens that has high optical performance can be obtained.

In each exemplary embodiment, the value ranges of the conditional expressions (1) to (6) are preferably set as follows:

$$-6.60 < f1/f2 < -5.20 \quad (1a)$$

$$1.20 < f3/f4 < 1.45 \quad (2a)$$

$$3.82 < f4/fw < 4.70 \quad (3a)$$

$$-10.00 < \beta 2t < -5.85 \quad (4a)$$

$$76.0 < vd1p < 96.0 \quad (5a)$$

$$15.0 < vd2p < 19.0 \quad (6a)$$

Further, the value ranges of the conditional expressions (1) to (6) are more preferably set as follows:

$$-6.42 < f1/f2 < -5.60 \quad (1b)$$

$$1.21 < f3/f4 < 1.37 \quad (2b)$$

$$3.84 < f4/fw < 4.35 \quad (3b)$$

$$-9.30 < \beta 2t < -5.90 \quad (4b)$$

$$81.0 < vd1p < 90.0 \quad (5b)$$

$$16.0 < vd2p < 18.0 \quad (6b)$$

Further, the zoom lens according to each exemplary embodiment more preferably satisfies at least one of the following conditional expressions:

$$nd2n1 > 1.900 \quad (7)$$

$$0.070 < (TL/f1)/(ft/fw) < 0.100 \quad (8)$$

$$0.95 < (TL/\phi t)/(ft/fw) < 1.20 \quad (9)$$

$$1.30 < BFw/fw < 4.00 \quad (10)$$

$$21.0 < \beta 2t/\beta 2w < 45.0 \quad (11)$$

$$1.30 < \beta 4t/\beta 4w < 2.60 \quad (12)$$

$$0.000 < L1w/TL < 0.020 \quad (13)$$

$$0.000 < L2t/TL < 0.050 \quad (14)$$

In the conditional expressions, a refractive index based on the d line of the lens provided closest to the object side in the second lens unit U2 is denoted by "nd2n1," a distance on the optical axis from a lens surface closest to the object side in the first lens unit U1 to the image plane is denoted by "TL," a focal length of the entire system at the telephoto end is denoted by "ft," and an imaging half angle of view at the telephoto end is denoted by "ωt." Further, back focus at the wide-angle end is denoted by "BFw," a lateral magnification of the second lens unit U2 during focusing on the infinite-distance object at the wide-angle end is denoted by "β2w," and a lateral magnification of the fourth lens unit U4 during focusing on the infinite-distance object at the wide-angle end is denoted by "β4w." Further, the lateral magnification of the fourth lens unit U4 during focusing on the infinite-distance object at the telephoto end is denoted by "β4t," a distance on the optical axis between the first lens unit U1 and the second lens unit U2 at the wide-angle end is denoted by "L1w," and a distance on the optical axis between the second lens unit U2 and the third lens unit U3 at the telephoto end is denoted by L2t."

The conditional expression (7) defines a value range of a refractive index nd2n1 based on the d line of a negative lens provided closest to the object side in the second lens unit U2. When a negative lens is provided closest to the object side in the second lens unit U2 and a material having a high refractive index is used for the negative lens, a principal point position of the second lens unit U2 can be shifted to the object side. With this configuration, an entrance pupil position can be shifted to the object side and a front lens effective diameter can be reduced.

When the refractive index nd2n1 based on the d line of the negative lens provided closest to the object side in the second lens unit U2 becomes lower than a lower limit of the conditional expression (7), various aberrations occur a lot throughout the entire zoom area, and a front lens effective diameter increases, which is not preferable.

The conditional expression (8) defines a ratio between a distance TL on the optical axis from the lens surface closest to the object side in the first lens unit U1 to the image plane and the focal length f1 of the first lens unit U1.

When the focal length f1 of the first lens unit U1 becomes shorter so that the ratio TL/f1 exceeds an upper limit of the conditional expression (8), the refractive power of the first lens unit U1 becomes too strong, and various aberrations generated inside the first lens unit U1 accordingly increase.

Especially, axial chromatic aberration or the like generated in the first lens unit U1 is increased by the optical system including the second lens unit U2 and subsequent lens units, and it accordingly becomes difficult to obtain desirable optical performance as the entire zoom lens, which is not preferable.

Further, when the distance TL on the optical axis from the lens surface closest to the object side in the first lens unit U1 to the image plane becomes longer so that the ratio TL/f1 exceeds the upper limit of the conditional expression (8), it becomes difficult to realize downsizing of the zoom lens, which is not preferable.

When the focal length f1 of the first lens unit U1 becomes longer so that the ratio TL/f1 falls below a lower limit of the conditional expression (8), the refractive power of the first lens unit U1 becomes too weak, and it accordingly becomes difficult to realize downsizing of the entire lens system, which is not preferable.

Further, when the distance TL on the optical axis from the lens surface closest to the object side in the first lens unit U1 to the image plane becomes shorter so that the ratio TL/f1 falls below the lower limit of the conditional expression (8), the refractive power of each lens unit needs to be increased, and it accordingly becomes difficult to suppress variations in various aberrations caused by zooming, which is not preferable.

The conditional expression (9) defines a ratio between the distance TL on the optical axis from the lens surface closest to the object side in the first lens unit U1 to the image plane and an effective image circle radius (φt at the telephoto end (a maximum image height).

When the distance TL on the optical axis from the lens surface closest to the object side in the first lens unit U1 to the image plane becomes longer so that the ratio TL/φt exceeds an upper limit of the conditional expression (9), the total lens length becomes too long with respect to the effective image circle radius φt at the telephoto end, which is not preferable. Further, when the distance TL on the optical axis from the lens surface closest to the object side in the first lens unit U1 to the image plane becomes shorter so that the ratio TL/φt falls below a lower limit of the conditional expression (9), the refractive power of each lens unit needs to be increased, and it accordingly becomes difficult to suppress variations in various aberrations caused by zooming, which is not preferable.

The conditional expression (10) defines a ratio between the back focus BFw at the wide-angle end and the focal length fw of the entire system at the wide-angle end.

When the back focus BFw at the wide-angle end becomes longer so that the ratio BFw/fw exceeds an upper limit of the conditional expression (10), the refractive power of the fourth lens unit U4 provided closest to the image side becomes too weak. This consequently increases the amount of movement of the fourth lens unit U4 during focusing and zooming, and the total lens length accordingly increases, which is not preferable. When the back focus BFw at the wide-angle end becomes shorter so that the ratio BFw/fw falls below a lower limit of the conditional expression (10), the distance between the fourth lens unit U4 and the image plane IP becomes too short, and it accordingly becomes difficult to place the optical block G or the like, which is not preferable.

The conditional expression (11) defines a ratio between the lateral magnification β2w of the second lens unit U2 during focusing on the infinite-distance object at the wide-angle end and the lateral magnification β2t of the second lens unit U2 during focusing on the infinite-distance object at the telephoto end.

When the ratio β2t/β2w exceeds an upper limit of the conditional expression (11), a zooming ratio of the second lens unit U2 becomes too high, and variations in various aberrations caused by zooming accordingly increase, which is not preferable.

When the ratio β2t/β2w falls below a lower limit of the conditional expression (11), the zooming ratio of the second lens unit U2 becomes too low, and it accordingly becomes difficult to realize a high magnification, which is not preferable.

The conditional expression (12) defines a ratio between the lateral magnification β4w of the fourth lens unit U4 during focusing on the infinite-distance object at the wide-angle end and the lateral magnification β4t of the fourth lens unit U4 during focusing on the infinite-distance object at the telephoto end.

When the ratio β4t/β4w exceeds an upper limit of the conditional expression (12), the refractive power of the fourth lens unit U4 becomes too strong and the distance between the fourth lens unit U4 and the image plane IP becomes too short, so that it becomes difficult to provide the optical block G or the like, which is not preferable.

When the ratio ρ4t/β4w falls below a lower limit of the conditional expression (12), the zooming ratio of the fourth lens unit U4 becomes too low, and it accordingly becomes difficult to realize a high magnification, which is not preferable.

The conditional expression (13) defines a ratio between a distance L1w on the optical axis between the first lens unit U1 and the second lens unit U2 at the wide-angle end and the distance TL on the optical axis from the lens surface closest to the object side in the first lens unit U1 to the image plane.

When the distance L1w on the optical axis between the first lens unit U1 and the second lens unit U2 at the wide-angle end becomes longer so that the ratio L1w/TL exceeds an upper limit of the conditional expression (13), it becomes difficult to realize downsizing, which is not preferable. When the distance L1w on the optical axis between the first lens unit U1 and the second lens unit U2 at the wide-angle end becomes shorter so that the ratio L1w/TL falls below a lower limit of the conditional expression (13), the first lens unit U1 and the second lens unit U2 interface with each other, which is not preferable.

The conditional expression (14) defines a ratio between the distance L2t on the optical axis between the second lens unit U2 and the third lens unit U3 at the telephoto end and the distance TL on the optical axis from the lens surface closest to the object side in the first lens unit U1 to the image plane.

When the distance L2t on the optical axis between the second lens unit U2 and the third lens unit U3 at the telephoto end becomes longer so that the ratio L2t/TL exceeds an upper limit of the conditional expression (14), it becomes difficult to realize downsizing, which is not preferable. When the distance L2t on the optical axis between the second lens unit U2 and the third lens unit U3 at the telephoto end becomes shorter so that the ratio L2t/TL falls below a lower limit of the conditional expression (14), the second lens unit U2 and the third lens unit U3 interface with each other, which is not preferable.

The value ranges of the conditional expressions (7) to (14) are preferably set as follows:

$$nd2n1 > 1.940 \quad (7a)$$

$$0.074 < (TL/f1)/(ft/fw) < 0.099 \quad (8a)$$

$$0.97 < (TL/\phi t)/(ft/fw) < 1.18 \quad (9a)$$

$$2.00 < BFw/fw < 3.00 \quad (10a)$$

$$22.0 < \beta 2t/\beta 2w < 43.0 \quad (11a)$$

$$1.35 < \beta 4t/\beta 4w < 2.50 \quad (12a)$$

$$0.0010 < L1w/TL < 0.015 \quad (13a)$$

$$0.010 < L2t/TL < 0.040 \quad (14a)$$

The value ranges of the conditional expressions (7) to (14) are more preferably set as follows:

$$nd2n1 > 1.950 \quad (7b)$$

$$0.076 < (TL/f1)/(ft/fw) < 0.098 \quad (8b)$$

$$0.98 < (TL/\phi t)/(ft/fw) < 1.17 \quad (9b)$$

$$2.30 < BFw/fw < 2.80 \quad (10b)$$

$$23.0 < \beta 2t/\beta 2w < 41.0 \quad (11b)$$

$$1.40 < \beta 4t/\beta 4w < 2.40 \quad (12b)$$

$$0.0040 < L1w/TL < 0.010 \quad (13b)$$

$$0.015 < L2t/TL < 0.030 \quad (14b)$$

Further, in the zoom lens according to each exemplary embodiment, the first lens unit U1 consists of, in order from the object side to the image side thereof, a negative lens, a positive lens, a positive lens, and a positive lens. The zoom lens according to each exemplary embodiment is a high-power zoom lens having a zooming ratio of about 20 to 30 and, and since axial chromatic aberration generated inside the first lens unit U1 is increased by the optical system including the second lens unit U2 and subsequent lens units, axial chromatic aberration is likely to be generated near the telephoto end.

In the zoom lens according to each exemplary embodiment, by providing a negative lens and three positive lens in the first lens unit U1, axial chromatic aberration generated inside the first lens unit U1 is reduced.

Further, in the zoom lens according to each exemplary embodiment, the second lens unit U2 includes three or more lenses including at least two negative lenses and at least one positive lens.

In the zoom lens according to each exemplary embodiment, to realize a high magnification, the refractive power of the second lens unit U2 serving as a magnification-varying unit is increased. As a result, both of the downsizing and high magnification of the zoom lens are achieved. Here, to increase the refractive power of the second lens unit U2, it is required to increase refractive power of each lens included in the second lens unit U2. In the zoom lens according to each exemplary embodiment, by providing at least two negative lenses in the second lens unit U2, the negative refractive power is shared by the plurality of negative lenses and variations in various aberrations generated in each lens due to zooming are suppressed.

Further, in the zoom lens according to each exemplary embodiment, at least one lens (aspheric lens) having an aspheric shaped lens surface is provided in the third lens unit U3. In the zoom lens according to each exemplary embodiment, the aperture ratio at the wide-angle end is about 1.6, and spherical aberration or coma aberration is likely to be generated. Thus, by providing the aspheric lens in the third lens unit U3, the generation of such spherical aberration or coma aberration is efficiently suppressed.

Next, a configuration of each lens unit will be described. In the zoom lens according to each exemplary embodiment, the first lens unit U1 consists of, in order from the object side to the image side thereof, a negative lens, a positive lens, a positive lens, and a positive lens.

In each of the zoom lenses according to the first to sixth exemplary embodiments, the second lens unit U2 consists of three negative lenses and one positive lens. Further, in the zoom lens according to the seventh exemplary embodiment, the second lens unit U2 consists of two negative lenses and one positive lens, and at least one of the lenses is an aspheric lens. With this configuration, while reducing the number of lenses constituting the second lens unit U2, the reduction in the optical performance can be suppressed.

In each of the zoom lenses according to the first to fourth, sixth and seventh exemplary embodiment, the third lens unit U3 consists of, in order from the object side to the image side thereof, a positive lens and a negative lens. By providing the positive lenses and the negative lens in order from the object side to the image side thereof, a principal point distance between the third lens unit U3 and the fourth lens unit U4 can be made longer, and the amount of movement of the fourth lens unit U4 can be reduced. This can consequently contribute to the shortening of the total lens length.

In the zoom lenses according to the fifth exemplary embodiment, the third lens unit U3 consists of, in order from the object side to the image side thereof, a positive lens, a positive lens, and a negative lens thereof. By providing two positive lenses, the positive refractive power is shared by the plurality of positive lenses, and variations in various aberrations generated in each lens due to zooming are suppressed.

In the zoom lenses according to the first to fourth, sixth and seventh exemplary embodiments, the fourth lens unit U4 consists of a cemented lens in which a positive lens and a negative lens are cemented, in order from the object side to the image side thereof. By using the positive lens and the negative lens, variation in chromatic aberration caused by zooming can be suppressed.

In the zoom lenses according to the fifth exemplary embodiment, the fourth lens unit U4 consists of, in order from the object side to the image side thereof, a cemented lens in which a positive lens and a negative lens are cemented, and a positive lens. By providing the two positive lenses, the positive refractive power is shared by the plurality of positive lenses, and variations in various aberrations generated in each lens due to zooming are suppressed.

Next, the following provides lens data related to Numerical Embodiments 1 to 7 respectively corresponding to the first to seventh exemplary embodiments according to the present invention. In each numerical embodiment, an order from the object side to an optical surface is denoted by "i." A curvature radius of the "i"th optical surface (the "i"th surface) is denoted by "ri," a distance between the "i"th surface and the "i+1"th surface is denoted by "di," and a refractive index and Abbe number of the material of the "i"th optical member for to the d line are denoted by "ndi" and "vdi," respectively.

Further, the aspheric shape can be expressed as follows:

$$x=(h^2/R)/[1+[1-(1+K)(h/R)^2]^{1/2}]+A3h^3+A4h^4+A5h^5+A6h^6+A7h^7+A8h^8+A9h^9+A10h^{10},$$

where eccentricity is denoted by "K," aspheric coefficients are denoted by "A3," "A4," "A5," "A6," "A7," "A8," "A9," and "A10," and displacement of the optical axis direction at the position of a height h from the optical axis is denoted by "x" based on the surface vertex. Here, a paraxial curvature radius is denoted by "R." Further, the expression of "e-Z" indicates "$10^{-z}$".

In each exemplary embodiment, the back focus (BF) indicates a distance from a surface closest to the image side in the lens system to the image plane, based on an air conversion length. Further, Table 1 shows a correspondence between each numerical embodiment and the above described conditional expressions.

Here, an effective image circle diameter (a diameter of an image circle) at the wide-angle end can be made smaller than an effective image circle diameter at the telephoto end. This is because that barrel-shaped distortion aberration which is likely to be generated at the wide-angle side can be corrected by enlarging the image by image processing.

[Numerical Embodiment 1]

Unit mm

Surface data

| Surface number | r | d | nd | vd |
|---|---|---|---|---|
| 1 | 55.000 | 1.25 | 1.85478 | 24.8 |
| 2 | 32.797 | 5.73 | 1.49700 | 81.5 |
| 3 | 279.125 | 0.15 | | |
| 4 | 34.086 | 3.95 | 1.49700 | 81.5 |
| 5 | 134.865 | 0.10 | | |
| 6 | 30.111 | 2.67 | 1.69680 | 55.5 |
| 7 | 63.538 | (variable) | | |
| 8 | 54.884 | 0.50 | 1.95375 | 32.3 |
| 9 | 6.097 | 2.16 | | |
| 10 | 30.843 | 0.45 | 1.83481 | 42.7 |
| 11 | 16.287 | 1.52 | | |
| 12 | −16.393 | 0.45 | 1.83481 | 42.7 |
| 13 | 33.793 | 0.15 | | |
| 14 | 16.874 | 1.72 | 1.95906 | 17.5 |
| 15 | −48.857 | (variable) | | |
| 16 (stop) | ∞ | 1.00 | | |
| 17* | 10.691 | 4.72 | 1.58313 | 59.5 |
| 18* | −24.394 | 1.46 | | |
| 19 | 21.604 | 0.50 | 2.00069 | 25.5 |
| 20 | 10.450 | (variable) | | |
| 21 | 18.509 | 3.90 | 1.60311 | 60.6 |
| 22 | −10.164 | 0.50 | 2.00069 | 25.5 |
| 23 | −17.092 | (variable) | | |
| 24 | ∞ | 1.50 | 1.51500 | 70.0 |
| 25 | ∞ | 3.80 | | |
| Image plane | ∞ | | | |

Aspheric surface data

Seventeenth surface

K = −1.02686e+000
A3 = −1.84598e−005 A5 = 2.58119e−006 A7 = 1.17540e−008

Eighteenth surface

K = −1.21069e+001
A3 = −3.21956e−005 A5 = 4.61800e−006 A7 = −1.59425e−008

Unit mm

Various data
Zoom ratio 24.95

| | Wide angle | Middle | Telephoto |
|---|---|---|---|
| Focal length | 4.82 | 41.91 | 120.36 |
| F-number | 1.65 | 3.58 | 4.00 |
| Half angle of view (degree) | 33.97 | 4.43 | 1.55 |
| Image height | 3.25 | 3.25 | 3.25 |
| Total lens length | 84.60 | 84.60 | 84.60 |
| BF | 12.58 | 20.01 | 6.84 |
| d 7 | 0.60 | 21.88 | 26.55 |
| d15 | 27.32 | 6.04 | 1.37 |
| d20 | 11.23 | 3.80 | 16.97 |
| d23 | 7.79 | 15.22 | 2.05 |

Zoom lens unit data

| Unit | First surface | Focal length |
|---|---|---|
| 1 | 1 | 39.03 |
| 2 | 8 | −6.26 |
| 3 | 17 | 24.31 |
| 4 | 21 | 19.79 |

[Numerical Embodiment 2]

Unit mm

Surface data

| Surface number | r | d | nd | vd |
|---|---|---|---|---|
| 1 | 76.044 | 1.70 | 1.85478 | 24.8 |
| 2 | 44.859 | 8.08 | 1.49700 | 81.5 |
| 3 | 445.709 | 0.21 | | |
| 4 | 45.918 | 5.07 | 1.49700 | 81.5 |
| 5 | 210.585 | 0.14 | | |
| 6 | 41.227 | 3.17 | 1.69680 | 55.5 |
| 7 | 88.862 | (variable) | | |
| 8 | 125.485 | 0.70 | 1.95375 | 32.3 |
| 9 | 9.448 | 3.33 | | |
| 10 | 66.994 | 0.60 | 1.83481 | 42.7 |
| 11 | 19.181 | 2.69 | | |
| 12 | −20.299 | 0.60 | 1.83481 | 42.7 |
| 13 | 3199.020 | 0.15 | | |
| 14 | 33.079 | 2.16 | 1.95906 | 17.5 |
| 15 | −46.222 | (variable) | | |
| 16 (stop) | ∞ | (variable) | | |
| 17* | 12.189 | 5.17 | 1.58313 | 59.5 |
| 18* | −50.490 | 2.45 | | |
| 19 | 19.252 | 0.70 | 2.00069 | 25.5 |
| 20 | 10.749 | (variable) | | |
| 21* | 18.657 | 4.00 | 1.55332 | 71.7 |
| 22 | −13.126 | 0.70 | 2.00069 | 25.5 |
| 23 | −21.373 | (variable) | | |
| 24 | ∞ | 2.08 | 1.51500 | 70.0 |
| 25 | ∞ | 3.80 | | |
| Image plane | ∞ | | | |

Aspheric surface data

Seventeenth surface

K = −9.57390e−001
A3 = 1.37191e−005 A5 = 9.43502e−007 A7 = 8.81440e−009

Eighteenth surface

K = −1.50396e+001
A3 = 2.99426e−005 A5 = 2.20054e−006 A7 = −4.82016e−009

Twenty-first surface

K = −2.48870e−001 A4 = −4.40444e−006 A6 = 7.36682e−009
A8 = 5.76115e−010

-continued

| Unit mm | | | |
|---|---|---|---|
| Various data Zoom ratio 22.99 | | | |
| | Wide angle | Middle | Telephoto |
| Focal length | 5.62 | 45.70 | 129.22 |
| F-number | 1.65 | 3.17 | 3.50 |
| Half angle of view (degree) | 38.68 | 5.62 | 1.99 |
| Image height | 4.50 | 4.50 | 4.50 |
| Total lens length | 109.41 | 109.41 | 109.41 |
| BF | 14.64 | 22.05 | 11.21 |
| d 7 | 0.60 | 28.41 | 34.52 |
| d15 | 34.95 | 7.14 | 1.04 |
| d16 | 6.71 | 3.64 | 1.00 |
| d20 | 10.89 | 6.54 | 20.03 |
| d23 | 9.47 | 16.87 | 6.04 |

| Zoom lens unit data | | |
|---|---|---|
| Unit | First surface | Focal length |
| 1 | 1 | 51.64 |
| 2 | 8 | −8.91 |
| 3 | 17 | 31.48 |
| 4 | 21 | 24.12 |

[Numerical Embodiment 3]

| Unit mm | | | | |
|---|---|---|---|---|
| Surface data | | | | |
| Surface number | r | d | nd | νd |
| 1 | 60.034 | 1.25 | 1.85478 | 24.8 |
| 2 | 36.361 | 5.83 | 1.49700 | 81.5 |
| 3 | 302.800 | 0.15 | | |
| 4 | 38.769 | 3.75 | 1.59522 | 67.7 |
| 5 | 120.928 | 0.10 | | |
| 6 | 32.197 | 2.96 | 1.59522 | 67.7 |
| 7 | 72.003 | (variable) | | |
| 8 | 59.450 | 0.50 | 1.95375 | 32.3 |
| 9 | 6.419 | 2.12 | | |
| 10 | 26.411 | 0.45 | 1.91082 | 35.3 |
| 11 | 13.903 | 1.81 | | |
| 12 | −14.972 | 0.45 | 1.91082 | 35.3 |
| 13 | 74.173 | 0.15 | | |
| 14 | 20.961 | 1.87 | 1.95906 | 17.5 |
| 15 | −28.794 | (variable) | | |
| 16 (stop) | ∞ | 1.00 | | |
| 17* | 11.204 | 4.81 | 1.58313 | 59.5 |
| 18* | −25.488 | 1.60 | | |
| 19 | 22.684 | 0.50 | 2.00069 | 25.5 |
| 20 | 10.786 | (variable) | | |
| 21 | 19.694 | 3.84 | 1.60311 | 60.6 |
| 22 | −10.624 | 0.50 | 2.00069 | 25.5 |
| 23 | −17.536 | (variable) | | |
| 24 | ∞ | 1.50 | 1.51500 | 70.0 |
| 25 | ∞ | 3.80 | | |
| Image plane | ∞ | | | |

Aspheric surface data

Seventeenth surface

K = −1.09931e+000
A3 = 7.88892e−007  A5 = 2.87708e−006  A7 = 2.26419e−009
Eighteenth surface K = −1.15637e+001
A3 = −1.23300e−005  A5 = 3.64844e−006  A7 = −1.41845e−008

-continued

| Unit mm | | | |
|---|---|---|---|
| Various data Zoom ratio 27.93 | | | |
| | Wide angle | Middle | Telephoto |
| Focal length | 4.76 | 43.30 | 132.90 |
| F-number | 1.65 | 3.58 | 4.00 |
| Half angle of view (degree) | 34.33 | 4.29 | 1.40 |
| Image height | 3.25 | 3.25 | 3.25 |
| Total lens length | 89.58 | 89.58 | 89.58 |
| BF | 12.98 | 20.86 | 6.84 |
| d 7 | 0.60 | 24.71 | 30.00 |
| d15 | 30.54 | 6.44 | 1.15 |
| d20 | 11.81 | 3.93 | 17.95 |
| d23 | 8.19 | 16.07 | 2.05 |

| Zoom lens unit data | | |
|---|---|---|
| Unit | First surface | Focal length |
| 1 | 1 | 43.09 |
| 2 | 8 | −6.72 |
| 3 | 17 | 26.11 |
| 4 | 21 | 20.46 |

[Numerical Embodiment 4]

| Unit mm | | | | |
|---|---|---|---|---|
| Surface data | | | | |
| Surface number | r | d | nd | νd |
| 1 | 57.193 | 1.25 | 1.85478 | 24.8 |
| 2 | 30.473 | 5.85 | 1.49700 | 81.5 |
| 3 | 216.927 | 0.15 | | |
| 4 | 33.402 | 3.81 | 1.69680 | 55.5 |
| 5 | 111.160 | 0.10 | | |
| 6 | 32.975 | 2.42 | 1.69680 | 55.5 |
| 7 | 65.793 | (variable) | | |
| 8 | 57.135 | 0.50 | 1.95375 | 32.3 |
| 9 | 6.353 | 2.17 | | |
| 10 | 29.455 | 0.45 | 1.83481 | 42.7 |
| 11 | 16.502 | 1.59 | | |
| 12 | −16.630 | 0.45 | 1.83481 | 42.7 |
| 13 | 33.212 | 0.15 | | |
| 14 | 17.374 | 1.75 | 1.95906 | 17.5 |
| 15 | −48.984 | (variable) | | |
| 16 (stop) | ∞ | 1.00 | | |
| 17* | 9.702 | 4.58 | 1.58313 | 59.5 |
| 18* | −27.502 | 1.51 | | |
| 19 | 17.893 | 0.50 | 2.00069 | 25.5 |
| 20 | 9.080 | (variable) | | |
| 21 | 16.234 | 3.85 | 1.60311 | 60.6 |
| 22 | −9.778 | 0.50 | 2.00069 | 25.5 |
| 23 | −16.945 | (variable) | | |
| 24 | ∞ | 1.50 | 1.51500 | 70.0 |
| 25 | ∞ | 3.80 | | |
| Image plane | ∞ | | | |

Aspheric surface data

Seventeenth surface

K = −1.00320e+000
A3 = −2.97831e−006  A5 = 3.22092e−006  A7 = 2.35371e−008
Eighteenth surface K = −1.41855e+001
A3 = 2.51531e−006  A5 = 6.01040e−006  A7 = −2.41285e−008

-continued

Unit mm

Various data
Zoom ratio 21.97

|  | Wide angle | Middle | Telephoto |
|---|---|---|---|
| Focal length | 4.78 | 39.36 | 105.09 |
| F-number | 1.65 | 3.17 | 3.50 |
| Half angle of view (degree) | 34.19 | 4.72 | 1.77 |
| Image height | 3.25 | 3.25 | 3.25 |
| Total lens length | 81.56 | 81.56 | 81.56 |
| BF | 11.65 | 17.90 | 6.84 |
| d 7 | 0.60 | 21.51 | 26.09 |
| d15 | 26.85 | 5.94 | 1.36 |
| d20 | 9.88 | 3.63 | 14.69 |
| d23 | 6.86 | 13.11 | 2.05 |

Zoom lens unit data

| Unit | First surface | Focal length |
|---|---|---|
| 1 | 1 | 38.54 |
| 2 | 8 | −6.49 |
| 3 | 17 | 23.60 |
| 4 | 21 | 18.55 |

[Numerical Embodiment 5]

Unit mm

Surface data

| Surface number | r | d | nd | νd |
|---|---|---|---|---|
| 1 | 56.799 | 1.25 | 1.84666 | 23.8 |
| 2 | 34.251 | 5.31 | 1.49700 | 81.5 |
| 3 | 279.634 | 0.15 | | |
| 4 | 36.185 | 3.55 | 1.49700 | 81.5 |
| 5 | 139.790 | 0.10 | | |
| 6 | 29.719 | 2.80 | 1.69680 | 55.5 |
| 7 | 64.004 | (variable) | | |
| 8 | 45.698 | 0.60 | 2.00100 | 29.1 |
| 9 | 5.822 | 3.65 | | |
| 10* | −48.405 | 0.60 | 1.76802 | 49.2 |
| 11* | 35.061 | 0.12 | | |
| 12 | 43.892 | 0.50 | 1.91082 | 35.3 |
| 13 | 11.450 | 2.17 | 1.95906 | 17.5 |
| 14 | −132.546 | (variable) | | |
| 15 (stop) | ∞ | 1.00 | | |
| 16* | 10.559 | 4.17 | 1.69350 | 53.2 |
| 17* | −40.951 | 0.18 | | |
| 18 | 18.894 | 0.91 | 1.60311 | 60.6 |
| 19 | 25.147 | 0.60 | 2.00100 | 29.1 |
| 20 | 9.225 | (variable) | | |
| 21 | 19.776 | 3.57 | 1.60311 | 60.6 |
| 22 | −10.881 | 0.60 | 2.00069 | 25.5 |
| 23 | −22.189 | 0.15 | | |
| 24 | −118.535 | 1.28 | 1.51633 | 64.1 |
| 25 | −24.533 | (variable) | | |
| 26 | ∞ | 1.50 | 1.51500 | 70.0 |
| 27 | ∞ | 3.80 | | |
| Image plane | ∞ | | | |

Aspheric surface data

Tenth surface

K = 9.13879e+001 A4 = −1.22707e−003 A6 = 3.20881e−005
A8 = −3.80905e−007
A10 = −1.69004e−008

Eleventh surface

K = −2.32309e+001 A4 = −1.42060e−003 A6 = 3.44555e−005
A8 = −7.89692e−007
A10 = −5.23523e−009

-continued

Unit mm

Sixteenth surface

K = −4.38690e−001 A4 = −4.08007e−005 A6 = 7.92561e−008
A8 = 4.38561e−009
A10 = −7.57322e−011

Seventeenth surface

K = 1.23404e+001 A4 = 9.72088e−005 A6 = 1.63501e−007
A8 = −2.03402e−009
A10 = −1.33408e−011

Various data
Zoom ratio 23.92

|  | Wide angle | Middle | Telephoto |
|---|---|---|---|
| Focal length | 4.85 | 39.12 | 116.09 |
| F-number | 1.65 | 3.49 | 4.00 |
| Half angle of view (degree) | 33.81 | 4.75 | 1.60 |
| Image height | 3.25 | 3.25 | 3.25 |
| Total lens length | 84.40 | 84.40 | 84.40 |
| BF | 12.52 | 19.57 | 6.79 |
| d 7 | 0.60 | 21.55 | 26.79 |
| d14 | 27.19 | 6.24 | 1.00 |
| d20 | 10.82 | 3.77 | 16.55 |
| d25 | 7.73 | 14.78 | 2.00 |

Zoom lens unit data

| Unit | First surface | Focal length |
|---|---|---|
| 1 | 1 | 39.30 |
| 2 | 8 | −6.49 |
| 3 | 16 | 25.48 |
| 4 | 21 | 18.73 |

[Numerical Embodiment 6]

Unit mm

Surface data

| Surface number | r | d | nd | νd |
|---|---|---|---|---|
| 1 | 60.317 | 1.25 | 1.85478 | 24.8 |
| 2 | 35.901 | 5.76 | 1.49700 | 81.5 |
| 3 | 324.865 | 0.15 | | |
| 4 | 38.164 | 3.78 | 1.49700 | 81.5 |
| 5 | 129.226 | 0.10 | | |
| 6 | 33.475 | 2.83 | 1.69680 | 55.5 |
| 7 | 75.447 | (variable) | | |
| 8 | 43.553 | 0.50 | 2.00100 | 29.1 |
| 9 | 6.525 | 3.36 | | |
| 10 | −22.286 | 0.45 | 1.83481 | 42.7 |
| 11 | 24.635 | 0.51 | | |
| 12 | 14.889 | 2.14 | 1.95906 | 17.5 |
| 13 | −44.025 | 0.45 | 1.91082 | 35.3 |
| 14 | 83.683 | (variable) | | |
| 15 (stop) | ∞ | 1.00 | | |
| 16* | 10.746 | 4.81 | 1.58313 | 59.5 |
| 17* | −29.106 | 1.34 | | |
| 18 | 19.418 | 0.50 | 2.00069 | 25.5 |
| 19 | 10.168 | (variable) | | |
| 20 | 18.284 | 3.84 | 1.60311 | 60.6 |
| 21 | −10.896 | 0.50 | 2.00069 | 25.5 |
| 22 | −18.746 | (variable) | | |
| 23 | ∞ | 1.50 | 1.51500 | 70.0 |
| 24 | ∞ | 3.80 | | |
| Image plane | ∞ | | | |

| Unit mm |
| --- |
| Aspheric surface data |

Sixteenth surface

K = −9.98410e−001
A3 = 1.84306e−006 A5 = 2.00870e−006 A7 = 1.10851e−008

Seventeenth surface

K = −1.43239e+001
A3 = 2.84299e−006 A5 = 3.54144e−006 A7 = −1.14178e−008

| Various data Zoom ratio 26.95 | | | |
| --- | --- | --- | --- |
|  | Wide angle | Middle | Telephoto |
| Focal length | 4.85 | 44.37 | 130.72 |
| F-number | 1.65 | 3.58 | 4.00 |
| Half angle of view (degree) | 33.83 | 4.19 | 1.42 |
| Image height | 3.25 | 3.25 | 3.25 |
| Total lens length | 89.55 | 89.55 | 89.55 |
| BF | 12.74 | 20.85 | 6.84 |
| d 7 | 0.60 | 24.67 | 29.96 |
| d14 | 30.77 | 6.69 | 1.41 |
| d19 | 12.18 | 4.07 | 18.08 |
| d22 | 7.95 | 16.06 | 2.05 |

| Zoom lens unit data | | |
| --- | --- | --- |
| Unit | First surface | Focal length |
| 1 | 1 | 43.13 |
| 2 | 8 | −6.77 |
| 3 | 16 | 25.66 |
| 4 | 20 | 20.60 |

[Numerical Embodiment 7]

| Unit mm |
| --- |
| Surface data |

| Surface number | r | d | nd | vd |
| --- | --- | --- | --- | --- |
| 1 | 58.667 | 1.25 | 1.85478 | 24.8 |
| 2 | 34.815 | 5.80 | 1.49700 | 81.5 |
| 3 | 363.768 | 0.15 |  |  |
| 4 | 36.159 | 3.77 | 1.49700 | 81.5 |
| 5 | 119.284 | 0.10 |  |  |
| 6 | 32.168 | 2.75 | 1.69680 | 55.5 |
| 7 | 71.570 | (variable) |  |  |
| 8 | 49.221 | 0.50 | 1.95375 | 32.3 |
| 9 | 6.230 | 3.81 |  |  |
| 10* | −15.054 | 0.45 | 1.85135 | 40.1 |
| 11* | 26.942 | 0.53 |  |  |
| 12 | 24.970 | 1.76 | 1.95906 | 17.5 |
| 13 | −31.085 | (variable) |  |  |
| 14 (stop) | ∞ | 1.00 |  |  |
| 15* | 10.145 | 4.59 | 1.58313 | 59.5 |
| 16* | −28.390 | 1.81 |  |  |
| 17 | 19.093 | 0.50 | 2.00069 | 25.5 |
| 18 | 9.428 | (variable) |  |  |
| 19 | 16.746 | 3.90 | 1.60311 | 60.6 |
| 20 | −10.021 | 0.50 | 2.00069 | 25.5 |
| 21 | −17.101 | (variable) |  |  |
| 22 | ∞ | 1.50 | 1.51500 | 70.0 |
| 23 | ∞ | 3.80 |  |  |
| Image plane | ∞ |  |  |  |

| Aspheric surface data |
| --- |

Tenth surface

K = 1.63600e+000 A4 = −5.81393e−005 A6 = −6.42552e−008
A8 = −7.21516e−008

| Unit mm |
| --- |

Eleventh surface

K = −2.43612e+001 A4 = −6.17765e−005 A6 = −2.06892e−006
A8 = −1.18192e−009

Fifteenth surface

K = −1.05765e+000
A3 = 1.14761e−005 A5 = 3.80400e−006 A7 = 7.82312e−009

Sixteenth surface

K = −1.42800e+001
A3 = 6.34898e−006 A5 = 4.89347e−006 A7 = −2.17641e−008

| Various data Zoom ratio 22.97 | | | |
| --- | --- | --- | --- |
|  | Wide angle | Middle | Telephoto |
| Focal length | 4.82 | 40.34 | 110.69 |
| F-number | 1.65 | 3.17 | 3.50 |
| Half angle of view (degree) | 34.00 | 4.61 | 1.68 |
| Image height | 3.25 | 3.25 | 3.25 |
| Total lens length | 84.52 | 84.52 | 84.52 |
| BF | 11.91 | 18.18 | 6.84 |
| d 7 | 0.60 | 23.36 | 28.35 |
| d13 | 28.93 | 6.17 | 1.17 |
| d18 | 9.91 | 3.63 | 14.98 |
| d21 | 7.12 | 13.39 | 2.05 |

| Zoom lens unit data | | |
| --- | --- | --- |
| Unit | First surface | Focal length |
| 1 | 1 | 41.39 |
| 2 | 8 | −6.95 |
| 3 | 15 | 24.98 |
| 4 | 19 | 18.79 |

TABLE 1

|  | First Exemplary Embodiment | Second Exemplary Embodiment | Third Exemplary Embodiment | Fourth Exemplary Embodiment |
| --- | --- | --- | --- | --- |
| Conditional Expression (1) | −6.23 | −5.80 | −6.41 | −5.94 |
| Conditional Expression (2) | 1.23 | 1.30 | 1.28 | 1.27 |
| Conditional Expression (3) | 4.10 | 4.29 | 4.30 | 3.88 |
| Conditional Expression (4) | −8.27 | −6.01 | −9.09 | −7.69 |
| Conditional Expression (5) | 81.5 | 81.5 | 81.5 | 81.5 |
| Conditional Expression (6) | 17.5 | 17.5 | 17.5 | 17.5 |
| Conditional Expression (7) | 1.954 | 1.954 | 1.954 | 1.954 |
| Conditional Expression (8) | 0.087 | 0.093 | 0.075 | 0.097 |
| Conditional Expression (9) | 1.06 | 1.08 | 1.00 | 1.16 |
| Conditional Expression (10) | 2.61 | 2.60 | 2.73 | 2.44 |
| Conditional Expression (11) | 35.3 | 23.9 | 40.7 | 31.2 |
| Conditional Expression (12) | 2.01 | 1.45 | 2.02 | 1.92 |
| Conditional Expression (13) | 0.0070 | 0.0054 | 0.0067 | 0.0073 |
| Conditional Expression (14) | 0.028 | 0.018 | 0.024 | 0.029 |

TABLE 1-continued

| | Fifth Exemplary Embodiment | Sixth Exemplary Embodiment | Seventh Exemplary Embodiment |
|---|---|---|---|
| Conditional Expression (1) | −6.06 | −6.37 | −5.96 |
| Conditional Expression (2) | 1.36 | 1.25 | 1.33 |
| Conditional Expression (3) | 3.86 | 4.25 | 3.90 |
| Conditional Expression (4) | −8.76 | −8.64 | −8.19 |
| Conditional Expression (5) | 81.5 | 81.5 | 81.5 |
| Conditional Expression (6) | 17.5 | 17.5 | 17.5 |
| Conditional Expression (7) | 2.001 | 2.001 | 1.954 |
| Conditional Expression (8) | 0.090 | 0.077 | 0.089 |
| Conditional Expression (9) | 1.10 | 1.04 | 1.15 |
| Conditional Expression (10) | 2.58 | 2.63 | 2.47 |
| Conditional Expression (11) | 36.4 | 38.5 | 33.7 |
| Conditional Expression (12) | 2.33 | 1.95 | 1.97 |
| Conditional Expression (13) | 0.0071 | 0.0067 | 0.0071 |
| Conditional Expression (14) | 0.024 | 0.027 | 0.026 |

Next, an exemplary embodiment of a monitoring camera in which the zoom lens according to an exemplary embodiment of the present invention is used as an imaging optical system will be described with reference to FIG. 15.

In FIG. 15, the monitoring camera includes a monitoring camera body 30 and an imaging optical system 31 including the zoom lens according to any one of the above-described first to seventh exemplary embodiments. The monitoring camera further includes a solid-state image pickup element (a photoelectric conversion element) 32, such as a CCD sensor, a CMOS sensor or the like, which is built in the camera body 30, and receives an object image formed by the imaging optical system 31. The monitoring camera further includes a memory 33 for recording information corresponding to the object image photoelectrically-converted by the solid-state image pickup element 32. The monitoring camera further includes a network cable 34 for transferring the object image photoelectrically-converted by the solid-state image pickup element 32.

As described above, when the zoom lens according to an exemplary embodiment of the present invention is applied to an imaging apparatus such as a digital still camera, a compact and high-magnification imaging apparatus that has high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242517, filed Nov. 28, 2014, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power; and
   a fourth lens unit having positive refractive power,
   wherein, during zooming from a wide-angle end to a telephoto end, the first lens unit does not move and at least the second lens unit and the fourth lens unit move, and a distance between adjacent lens units varies during zooming,
   wherein the first lens unit includes, in order from the object side to the image side thereof, a negative lens, a positive lens, a positive lens, and a positive lens, and the second lens unit includes three or more lens elements including at least one positive lens,
   wherein one of the positive lenses included in the first lens unit satisfies a following conditional expression:

$74.0 < vd1p < 100.0$, wherein the second lens unit includes a positive lens that satisfies a following conditional expression:

$10.0 < vd2p < 21.0$, where Abbe number of a material of the one positive lens included in the first lens unit is denoted by vd1p and Abbe number of a material of the positive lens provided in the second lens unit is denoted by vd2p, and
   wherein following conditional expressions are satisfied:

$-7.30 < f1/f2 < -4.60$, $1.16 < f3/f4 < -1.55$, $3.80 < f4/fw < 6.50$, $0.95 < (TL/\Phi t)/(ft/fw) < 1.20$, and $-12.00 < \beta 2t < -5.80$, where a focal length of the first lens unit is denoted by f1, a focal length of the second lens unit is denoted by f2, a focal length of the third lens unit is denoted by f3, a focal length of the fourth lens unit is denoted by f4, a focal length of an entire system at the wide-angle end is denoted by fw, and a lateral magnification of the second lens unit during focusing on an infinite-distance object at the telephoto end is denoted by $\beta 2t$, a distance on an optical axis from a lens surface closest to the object side in the first lens unit to an image plane is denoted by TL, an effective image circle radius at the telephoto end is denoted by $\Phi$, and a focal length of the entire system at the telephoto end is denoted by ft.

2. The zoom lens according to claim 1, wherein the second lens unit includes two or more negative lenses and one or more positive lenses,
   wherein a lens provided closest to the object side in the second lens unit is a negative lens, and
   wherein a following conditional expression is satisfied:

$nd2n1 > 1.900$, where a refractive index based on a d line of a negative lens provided closest to the object side in the second lens unit is denoted by nd2n1.

3. The zoom lens according to claim 1, wherein a following conditional expression is satisfied:

$0.070 < (TL/f1)/(ft/fw) < 0.100$, where a distance on an optical axis from a lens surface closest to the object side in the first lens unit to an image plane is denoted by TL, and a focal length of the entire system at the telephoto end is denoted by ft.

4. The zoom lens according to claim 1, wherein a following conditional expression is satisfied:

$1.30<BFw/fw<4.00$, where a back focus of the zoom lens at the wide-angle end is denoted by BFw.

5. The zoom lens according to claim 1, wherein a following conditional expression is satisfied:

$21.0<\beta2t/\beta2w<45.0$, where a lateral magnification of the second lens unit during focusing on an infinite-distance object at the wide-angle end is denoted by β2w.

6. The zoom lens according to claim 1, wherein a following conditional expression is satisfied:

$1.30<\beta4t/\beta4w<2.60$, where a lateral magnification of the fourth lens unit during focusing on an infinite-distance object at the wide-angle end is denoted by β4w, and a lateral magnification of the fourth lens unit during focusing on the infinite-distance object at the telephoto end is denoted by β4t.

7. The zoom lens according to claim 1, wherein a following conditional expression is satisfied:

$0.000<L1w/TL<0.020$, where a distance on an optical axis from a lens surface closest to the object side in the first lens unit to an image plane is denoted by TL, and a distance on the optical axis between the first lens unit and the second lens unit at the wide-angle end is denoted by L1w.

8. The zoom lens according to claim 1, wherein a following conditional expression is satisfied:

$0.000<L2t/TL<0.050$, where a distance on an optical axis from a lens surface closest to the object side in the first lens unit to an image plane is denoted by TL, and a distance on the optical axis between the second lens unit and the third lens unit at the telephoto end is denoted by L2t.

9. The zoom lens according to claim 1, wherein the second lens unit consists of three negative lenses and one positive lens.

10. The zoom lens according to claim 1, wherein the second lens unit consists of two negative lenses and one positive lens, and at least one of the lenses included in the second lens unit has an aspheric shaped lens surface.

11. The zoom lens according to claim 1, wherein the third lens unit consists of, in order from the object side to the image side thereof, a positive lens and a negative lens, and at least one of the lenses included in the third lens unit has an aspheric shaped lens surface.

12. The zoom lens according to claim 1, wherein the third lens unit consists of, in order from the object side to the image side thereof, a positive lens, a positive lens and a negative lens, and at least one of the lenses included in the third lens unit has an aspheric shaped lens surface.

13. The zoom lens according to claim 1, wherein the fourth lens unit consists of one positive lens and one negative lens.

14. The zoom lens according to claim 1, wherein the fourth lens unit consists of two or more positive lenses and one negative lens.

15. An imaging apparatus comprising: a zoom lens including, in order from an object side to an image side:
a first lens unit having positive refractive power;
a second lens unit having negative refractive power;
a third lens unit having positive refractive power; and
a fourth lens unit having positive refractive power,
wherein, during zooming from a wide-angleend to a telephoto end, the first lens unit does not move and at least the second lens unit and the fourth lens unit move, and a distance between adjacent lens units varies during zooming,
wherein the first lens unit includes, in order from the object side to the image side thereof, a negative lens, a positive lens, a positive lens, and a positive lens, and the second lens unit includes three or more lens elements including at least one positive lens,
wherein one of the positive lenses included in the first lens unit satisfies a following conditional expression:

$74.0<vd1p<100.0$, wherein the second lens unit includes a positive lens that satisfies a following conditional expression:

$10.0<vd2p<21.0$, where Abbe number of a material of the one positive lens included in the first lens unit is denoted by vd1p and Abbe number of a material of the positive lens provided in the second lens unit is denoted by vd2p, and \
wherein following conditional expressions are satisfied:

$-7.30<f1/f2<-4.60$, $1.16<f3/f4<1.55$, $3.80<f4/fw<6.50$, $0.95<(TL/\Phi t)/(ft/fw)<1.20$, and $-12.00<\beta2t<-5.80$, where a focal length of the first lens unit is denoted by f1, a focal length of the second lens unit is denoted by f2, a focal length of the third lens unit is denoted by f3, a focal length of the fourth lens unit is denoted by f4, a focal length of an entire system at the wide-angle end is denoted by fw, and a lateral magnification of the second lens unit during focusing on an infinite-distance object at the telephoto end is denoted by β2t, a distance on an optical axis from a lens surface closest to the object side in the first lens unit to an image plane is denoted by TL, an effective image circle radius at the telephoto end is denoted by Φ, and a focal length of the entire system at the telephoto end is denoted by ft; and
an image pickup element configured to receive an image formed by the zoom lens.

* * * * *